US005963508A

United States Patent [19]
Withers

[11] Patent Number: 5,963,508
[45] Date of Patent: Oct. 5, 1999

[54] SYSTEM AND METHOD FOR DETERMINING EARTH FRACTURE PROPAGATION

[75] Inventor: Robert J. Withers, Plano, Tex.

[73] Assignee: Atlantic Richfield Company, Los Angeles, Calif.

[21] Appl. No.: 08/196,621

[22] Filed: Feb. 14, 1994

[51] Int. Cl.[6] ............................... G01V 1/34; G01V 1/48
[52] U.S. Cl. ............................... 367/38; 367/57; 367/86; 166/250.1
[58] Field of Search ................................. 367/38, 57, 86, 367/59; 166/250, 250.1; 364/421

[56] References Cited

U.S. PATENT DOCUMENTS

| | | |
|---|---|---|
| 3,108,439 | 10/1963 | Reynolds et al. . |
| 3,262,274 | 7/1966 | Nelson, Jr. . |
| 3,292,693 | 12/1966 | Hill et al. . |
| 3,331,206 | 7/1967 | Osborne . |
| 3,335,798 | 8/1967 | Querio et al. . |
| 3,374,633 | 3/1968 | Brandt . |
| 3,513,100 | 5/1970 | Stogner . |
| 3,576,513 | 4/1971 | Mathison et al. . |

(List continued on next page.)

OTHER PUBLICATIONS

"ASP: An Automated Seismic Processor for Microearthquake Networks", by T. V. McEvilly, et al, Bulletin of the Seismological Society of America, vol. 72, No. 1, pp. 303–325, Feb. 1982.
"Active and Passive Imaging of Hydraulic Fractures", by P.B. Wills, et al, Geophysics: The Leading Edge of Exploration, Jul. 1992, pp. 15–22.
"The Application of High Frequency Seismic Monitoring Methods for the Mapping of Grout Injections", by E. L. Majer, Int. J. Rock Mech. Min. Sci. & Geomech. Abstr. vol. 26, No 3/4, pp. 249–256, 1989.

Fix, James E., "Hydraulic Fracture Azimuth and Dimensional Characterization: Advanced Applications of Continuous Microseismic Radiation," Teledyne Geotech, Garland, TX 75040.
Fix, James E., et al., "Application of Microseismic Technology in a Devonian Shale Well in the Appalachian Basin," *SPE 23425*, SPE Regional Meeting, Lexington, KY, Oct. 22–25, 1991.
Hanson, M. E., et al., "Design, Execution, and Analysis of a Stimulation to Produce Gas from Thin Multiple Coal Seams," *SPE 16860*, 62nd Annual Conf. of the SPE, Dallas, TX, Sep. 27–30, 1987.

(List continued on next page.)

Primary Examiner—Charles T. Jordan
Assistant Examiner—Christopher K. Montgomery
Attorney, Agent, or Firm—F. Lindsey Scott

[57] ABSTRACT

Hydraulic fracture extension in earth formation zones of interest may be monitored by placing one or more monitor wells in predetermined positions on opposite sides of an azimuth aligned with the expected fracture plane extending from a fluid waste injection well. The monitor wells are provided with arrays of vertically spaced triaxial geophone units and the signals from the geophones are transmitted to a central processing unit for treatment and analysis to determine the location of micro-earthquake events which occur as the fracture propagates radially and, usually, vertically away from the injection well. Geophone signals are converted to digital format and selectively stored on magnetic tapes or in a shared memory of a central processing unit which is operable to display selected channels for geophone signals in a way so that minimum arrival time of a signal at a particular geophone will indicate the growth of the fracture in real time to control fluid waste disposal, for example. The converted data may be selectively screened by a program which eliminates weak or spurious signals and the screened signals may then be analyzed by a location routine and displayed in a manner which indicates the location of the detected and screened events with respect to the injection well.

12 Claims, 12 Drawing Sheets

U.S. PATENT DOCUMENTS

| | | | |
|---|---|---|---|
| 3,739,871 | 6/1973 | Bailey | 367/37 |
| 3,852,967 | 12/1974 | Stewart et al. . | |
| 4,057,780 | 11/1977 | Shuck | 367/86 |
| 4,167,213 | 9/1979 | Stoltz et al. . | |
| 4,524,434 | 6/1985 | Silverman | 367/37 |
| 4,630,868 | 12/1986 | Jones et al. | 299/4 |
| 4,787,452 | 11/1988 | Jennings, Jr. . | |
| 4,802,144 | 1/1989 | Holzhausen et al. | 367/35 |
| 4,828,030 | 5/1989 | Jennings, Jr. . | |
| 4,889,186 | 12/1989 | Hanson et al. | 166/252 |
| 4,906,135 | 3/1990 | Brassow et al. . | |
| 4,942,929 | 7/1990 | Malachosky et al. . | |
| 5,010,527 | 4/1991 | Mahrer | 367/86 |
| 5,108,226 | 4/1992 | Jennings, Jr. . | |
| 5,109,933 | 5/1992 | Jackson . | |
| 5,129,469 | 7/1992 | Jackson . | |
| 5,133,624 | 7/1992 | Cahill . | |
| 5,191,157 | 3/1993 | Crocker . | |
| 5,226,749 | 7/1993 | Perkins . | |
| 5,242,025 | 9/1993 | Neill et al. | 175/26 |
| 5,360,066 | 11/1994 | Venditto et al. | 166/250 |
| 5,377,104 | 12/1994 | Sorrells et al. | 364/421 |
| 5,405,224 | 4/1995 | Aubert et al. . | |

OTHER PUBLICATIONS

Mahrer, Kenneth D., "An Empirical Study of Instability and Improvement of Absorbing Boundary Conditions for the Elastic Wave Equation," *Geophysics*, 51:7, 1499–1501, Jul. 1986.

Mahrer, Kenneth D., "Using Wellbore–Monitored Seismicity for Delineating Man–Made Hydraulic Fractures," Teledyne Geotech, Garland, TX 75040, undated.

Mahrer, Kenneth D., "Numerical Time Step Instability and Stacey's and Clayton–Engquist's Absorbing Boundary Conditions," *Bulletin of the Seismological Society of Amer.*, 80:1, 13–217, Feb. 1990.

Mahrer, Kenneth D., "Hydraulic Fracture Height in Cased Wells," *Geoexploration*, 28 (1991), 221–250.

Mahrer, Kenneth D., "Microseismic Logging: A New Hydraulic Fracture Diagnostic Method," *SPE 21834*, Rocky Mountain Regional Mtg. and Symposium, Denver, CO, Apr. 15–17, 1991.

Mahrer, Kenneth D., et al., "Seismic Wave Motion for a New Model of Hydraulic Fracture With an Induced Low–Velocity Zone," *J. Geophysical Research*, 92:B9, 9293–9309, Aug. 10, 1987.

Majer, E. L., "The Application of High Frequency Seismic Monitoring Methods for the Mapping of Grout Injections," *Int. J. Rock Mech. Min. Sci. & Geomech. Abstr.*, 26:3/4, 249–256, 1989.

Mauk, F. J., et al., "Monitoring Hydraulic Fracture Stimulations With Long–Period Seismometers to Extract Induced Fracture Geometry," *SPE 15214*, SPE Symposium, Louisville, KY, May 18–21, 1986.

McEvilly, T. V., et al., "ASP: An Automated Seismic Processor for Microearthquake Networks," *Bulletin of the Seismological Society of Amer.*, 72:1, 303–325, Feb. 1982.

Smith, M. B., et al., "A Comprehensive Fracture Diagnostics Experiment: Part II—Comparison of Seven Fracture Azimuth Measurements," *SPE/DOE 13894*, SPE/DOE Denver, CO, May 19–22, 1985.

Sorrells, G. G., et al., "Advances in the Microseismic Method of Hydraulic Fracture Azimuth Estimation," *SPE 15216*, SPE Symposium, Louisville, KY, May 18–21, 1986.

Sorrells, G. G., "Development of a Novel Method for the Remediation and Disposal of Existing Hazardous Solid Wastes at Dept. of Defense Installations," Teledyne Geotech, Garland, TX 75046, no date.

Vinegar, H. J., et al., "Active and Passive Seismic Imaging of a Hydraulic Fracture in Diatomite," *J. Petroleum Engineers*, p. 28, Jan. 1992.

Wills, D. C., "Active and Passive Imaging of Hydraulic Fractures," *Geophysics: The Leading Edge of Exploration*, p. 15, Jul. 1992.

SYSTEM AND METHOD FOR DETERMINING EARTH FRACTURE PROPAGATION

BACKGROUND OF THE INVENTION

1. Field of the Invention

The present invention pertains to a system, including an array of geophones and a data recording and analysis system, and method for detecting "micro-earthquakes" caused by the extension of hydraulic fractures and a method for analyzing and displaying data related to the location of the fracture extension so that, for example, fracture extension resulting from injection of fluid or slurried solids waste materials into a formation zone through an injection well may be controlled.

2. Background

Hydraulic fracturing of certain zones of earth formations is a now commonly used method to stimulate the production of hydrocarbon fluids, for example. More recently, it has been proposed to dispose of certain fluids or slurried solids waste materials into certain zones of earth formations which will contain these materials by hydraulically fracturing the zone to a predetermined extent to at least partially provide space for disposal of such waste material. However, a long-standing problem in causing hydraulic fractures is determination of the lateral, as well as the vertical, extent or growth of the fracture away from the point of fracture origination, typically a fluid injection well. In particular, the geometry of hydraulic fractures created by the injection of waste materials into a formation zone of interest is critical to avoid causing the injected material to flow beyond predetermined boundaries and contaminate aquifers or other paths which may lead the waste material into unwanted areas. The growth or propagation of hydraulic fractures is also desirably measured to properly control the production of fluids from formation zones of interest.

An important consideration in monitoring the propagation of hydraulic fractures is determination of the fracture boundaries, including the radial extent of the fracture from an injection well on a so-called real-time basis so that, for example, the injection of liquid and slurried solids waste materials into an earth formation may be controlled to prevent deposition of the materials in unwanted zones. Certain governmental authorities have jurisdiction over what earth formations and zones of certain earth formations may receive waste materials. The accurate determination of the propagation of a hydraulic fracture on a real-time basis is thus of considerable importance.

Although the detection of seismic events such as micro-earthquakes and the like is a relatively developed art, there has been a need to provide a system and method for measuring certain micro-earthquake events, such as those caused by the propagation of hydraulic fractures, to separate the actual event indicating propagation of a fracture from other acoustic noise in the formation, such as fluid flow generated noise and surface transmitted noise from machinery and the like. Accordingly, the process of gathering large amounts of data generated during the extension of hydraulic fractures, and the rapid analysis and display of such data in a meaningful way which will indicate the location of an event which is part of a fracture propagation process, is of utmost importance to such endeavors as the disposal of slurried solids wastes and other fluid wastes through subterranean injection wells.

Moreover, heretofore there has been no direct ability to monitor the growth of hydraulically induced fractures during such growth, and the extent of fracture length, height, width and growth rate have been assumed from pre-fracture computations for a predetermined set of characteristics of the earth formation in which the fracture is induced. These fracture models have not always been sufficiently accurate and the ability to actually measure the lateral as well as vertical growth of a hydraulic fracture has been a long-sought goal. An article entitled "Active and Passive Imaging of Hydraulic Fractures" by P. B. Willis, et al, *Geophysics: The Leading Edge of Exploration*, July 1992, describes a system for monitoring the growth of hydraulic fractures from one or more instrumented monitor wells wherein the seismic events are measured by geophones and the resultant geophone signals are later subjected to signal analysis. An article entitled "The Application of High Frequency Seismic Monitoring Methods for the Mapping of Grout Injections" by E. L. Majer, *The International Journal of Rock Mechanics, Mining Science and Geomechanics*, Vol. 26, Nos. 3 and 4, pages 249–256, 1989, discusses a real-time monitoring system wherein digital data at sample rates greater than 50,000 samples per second are required to capture the necessary data. A sixteen channel system digitizes the data at up to 100,000 samples per second on each channel, saves the waveform, picks p-wave times, locates the events and plots the results in "close to real time using 3-D color graphics". The present invention provides an improved system and methods for determining the extent and location of hydraulic fractures propagated in the earth, particularly, but not limited to, those fractures caused by the injection of fluids through an injection well for waste disposal.

SUMMARY OF THE INVENTION

The present invention provides a unique system and method for determining at least one of the location and configuration of fractures in earth formations.

In accordance with an important aspect of the present invention, a system is provided for monitoring the extension of hydraulic fractures in earth formations from a fluid injection well, for example, wherein acoustic signals generated and propagated through the earth formation by the seismic events caused by growth of the fracture are recorded and transmitted to a processing system for display and analysis. A pattern of signals may be observed to detect the location of the fracture extension or propagation, and the shape of the fracture. In particular, predetermined seismic event analysis methods are employed to analyze selected sets of recorded data.

In accordance with another important aspect of the present invention, a method is provided for monitoring the growth or extension of hydraulic fractures by rapid and continuous acquisition of data, reading of data, storage of data and display of data on a real-time basis which will permit use of the fracture monitoring method to control fracture growth such as in the process of injecting fluidized wastes into certain earth formation zones.

The present invention provides an improved method for continuously recording and managing, on a real-time basis, a significant amount of seismic or micro-earthquake data collected from selected arrays of sensors or geophones and treatment of the data to provide a real-time display of fracture propagation events.

In accordance with another aspect of the present invention, a system is provided for continuously recording seismic data from a large array of sensors or geophones, transferring the data in predetermined quantities to a memory, to a real-time display and to a detection program for the detection and identification of valid events.

In accordance with another important aspect of the present invention, the location of significant events indicating the propagation of a fracture are calculated and displayed on a three-dimensional display of an injection well and monitor wells, if any, and the surrounding geology. The display of the seismic events shows limits indicating the accuracy of the location. The display may be supplemented with engineering data extracted through one or more computers monitoring the injection process. For example, the engineering data may include, but not be limited to, the fluid injection pressure into the injection well and the fluid injection rate.

In accordance with yet a further aspect of the present invention, a simplified yet accurate monitoring system is provided for monitoring the propagation of a hydraulic fracture in an earth formation zone wherein the presumed direction of extension of the hydraulic fracture is known. The system includes the provision of an instrumented injection well, or, alternatively, an injection well and one, or preferably two, instrumented monitoring wells disposed in a predetermined pattern with respect to the presumed direction of fracture extension. In this way, a simplified signal gathering system and analysis process may be carried out with less expense than would be required for conventional analysis techniques which require a substantial number of signal-receiving sensors or geophones located in complex arrays.

The advantages of the present invention include providing for changing hydraulic fracture characteristics of length, height and width as well as growth rate by altering the pressure and rate of the injection process. In particular, the invention provides for monitoring the growth of the fracture height to prevent the fracture from exceeding a design height or from unwanted breakthrough into a particular water, oil or gas-bearing formation zone, for example. There are significant environmental and regulatory implications to controlling the growth of fractures which contain waste materials. Still further, the method and system of the invention provide for identifying earth formation zones wherein significant stress contrast and strength variations in the earth formation away from the injection well may cause changes from a predicted extension or direction of growth of a hydraulically induced fracture.

Those skilled in the art will further appreciate the above-described features and advantages of the present invention and other superior aspects thereof upon reading the detailed description which follows in conjunction with the drawing.

DESCRIPTION OF PREFERRED EMBODIMENTS

Figure 1:
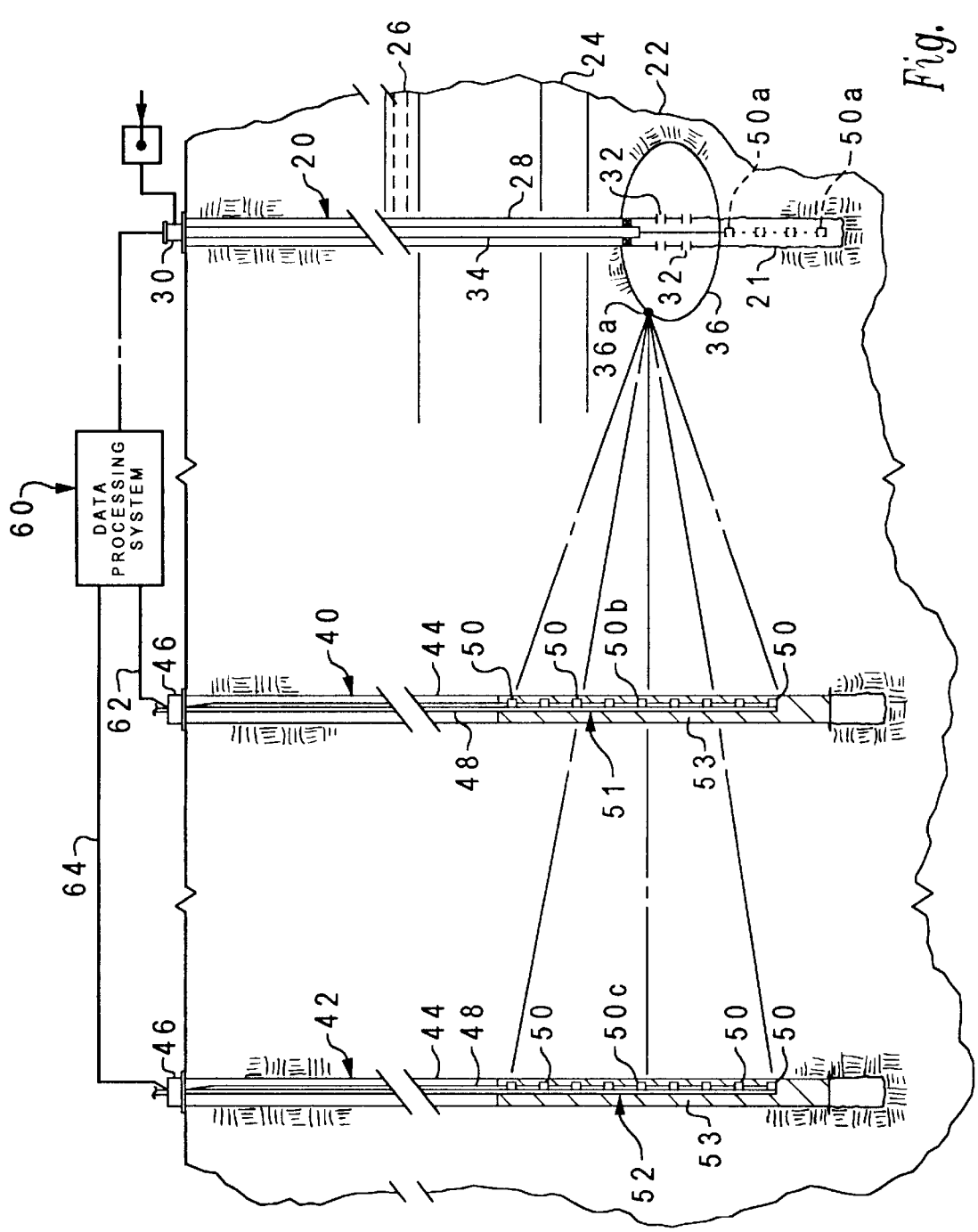
FIG. 1 is a schematic diagram showing a waste injection well and two instrumented monitoring wells in accordance with the present invention.

In the description which follows, like elements are indicated by the same reference numerals throughout the specification and drawing, respectively. The drawing figures are not to scale and certain figures are diagrams indicating the main features of method steps of the present invention which may be carried out on electronic digital processing devices. Accordingly, certain figures in the drawing represent major steps in the operation of a computer program, for example. Such programs are believed to be capable of being generated by one of ordinary skill in the art to which this invention pertains based on the description of the features and steps of the method of the invention described herein.

Figure 2:
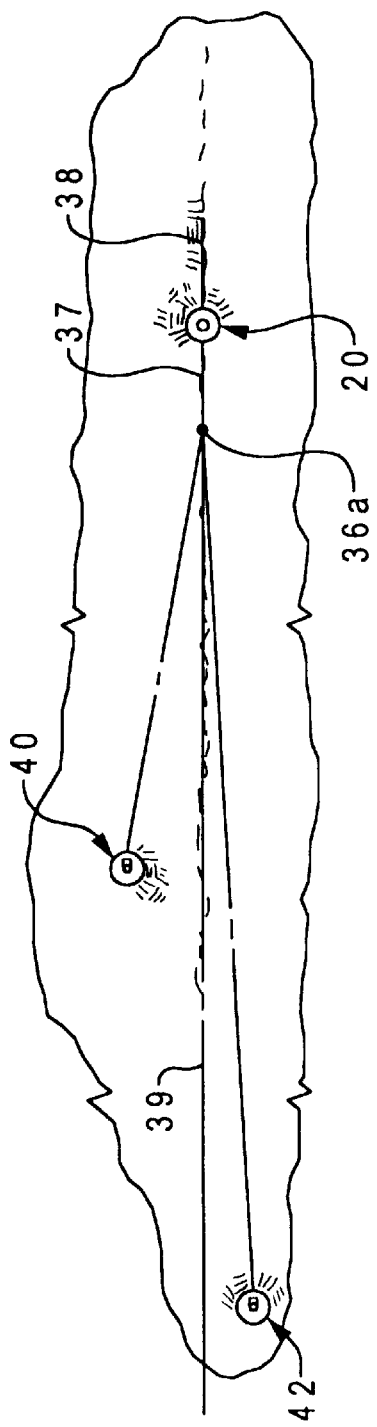
FIG. 2 is a plan view of the diagram of FIG. 1.

Referring to FIGS. 1 and 2, an exemplary arrangement of a system for monitoring the propagation of a hydraulically induced earth fracture is illustrated in somewhat schematic form. The disposal of certain liquid wastes and slurried particulate solids wastes may be carried out by providing an injection well 20, for example, extending into an earth formation zone 22 which, for example, is predetermined to have an in situ stress which may be less than the in situ stress of a zone 24 lying above the zone 22. In this way, there is some assurance that a hydraulically induced fracture extending from the well 20 will not break out into the zone 24 or into an aquifer 26, for example, lying above the zone 24. In any event, the disposal of certain wastes into subterranean earth formations must be controlled so that the wastes are contained within a predetermined formation zone and are not allowed to migrate into zones which might be tapped for the production of certain fluids or from which the wastes might otherwise migrate.

The well 20 includes a conventional tubular casing 28 extending from a conventional well head 30. An open hole portion 21 of the well extends below the casing 28 and the casing is perforated at 32 to allow fluids to be pumped into the well through a tubing string 34, for example, to exit the well through the perforations 32 and initiate a hydraulic fracture 36. The fracture 36, which is exemplary, is illustrated as a classic two-winged, vertically- and radially-extending hydraulically induced fracture. The radial propagation of "wings" 37 and 38 of the fracture 36 away from the well 20 is assumed to lie substantially in a plane which is normal to the minimum in situ compressive stress in the formation zone 22. The term "fracture" as used herein is not limited to the exemplary fracture 36, but may also include a type of fracture wherein the principal horizontal stresses are equal or unequal. In these situations fracture "networks" may develop which have either a circular or somewhat elliptical envelope when viewed in a horizontal plane. Still further, "fractures" may take the form of a zone of so-called disaggregated earth material as described in U.S. patent application Ser. No. 08/043,323, filed Apr. 6, 1993, by Joseph H. Schmidt, et al and assigned to the assignee of the present invention.

FIG. 2 illustrates the fracture wings 37 and 38 extending away from the well 20 in opposite directions and along a line or azimuth 39 defining the assumed fracture extension plane. The stress field in the formation zone 22 may be such that the fracture extends in other directions or may, in fact, be a substantially horizontally-extending fracture. However, the formation zone 22 may be selected to be such that the stress field is fairly uniform and provides for the propagation of the fracture 36 in a conventional manner as the classic two-winged, vertically- and radially-extending fracture. Predetermination of the orientation of the fracture plane 39 may be carried out using conventional stress field determination techniques such as oriented cores, impression packers and tilt meters, for example. Predetermination of the orientation of the assumed fracture plane defined by the line 39 is useful, although not mandatory, with regard to the method of the present invention.

Figure 3:
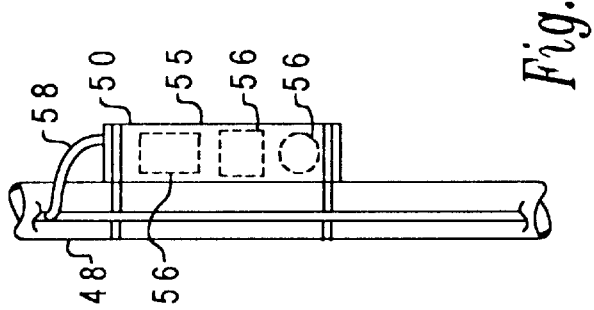
FIG. 3 is a detail view showing certain basic features of a geophone unit used with the geophone arrays disposed in the monitoring wells.

However, assuming that the fracture 36 will grow away from the well 20 along a vertically-extending plane defined by the line 39, it is desirable to place at least two monitor wells 40 and 42 a predetermined distance from the well 20 and on opposite sides of the plane defined by the line 39. Each of the wells 40 and 42, as illustrated, are provided with a conventional metal casing 44 and a wellhead 46, although the casing may not be required in all instances. Each of the monitor wells 40 and 42 is also shown with an elongated tubing string 48 extending within the well from the wellhead 46 and functioning as a support for an array of vertically spaced-apart sensors comprising, for example, geophone units 50. As illustrated, respective arrays 51 and 52 of geophone sensor units 50 are disposed such that they are spaced above and below the expected vertical boundaries of the hydraulic fracture 36. In order to enhance the acoustic coupling of the formation zone 22 to the geophone units 50, each wellbore of the wells 40 and 42 is filled with a quantity of cement 53 after the geophone arrays are placed in their working positions. The geophone units 50 may, for example, comprise plural 30 Hz broad band type sensors 56, such as a type SM-11, available from SENSOR, Houston, Tex., arranged in pods or containers 55, FIG. 3. Each of the pods 55 comprises three orthogonally-arranged sensors 56 disposed to provide one vertical and two horizontal event-sensing and signal-transmitting channels. Seismic signals generated by the sensors 56 are transmitted via suitable conductor means 58 to the surface and to a data receiving and processing system, generally designated by the numeral 60 in FIG. 1. The sensors 56 may also comprise accelerometers or hydrophones, for example.

By way of example, the injection well 20 may be characterized by 8.625 inch diameter surface casing and 2.875 inch diameter tubing 34 for injecting the waste materials into the fracture 36. A real-time bottom hole pressure gauge, not shown, is preferably installed in the wellbore portion 21 adjacent the perforations 32. Alternatively, an array of geophones may also be disposed in the injection well 20 near, above or below, the perforations 32. An exemplary location is shown in FIG. 1 wherein geophone units 50a are disposed in an open hole portion 21 of the injection well 20 below the perforations 32.

The monitor wells 40 and 42, by way of example, may also have casing diameters similar to that of the injection well. The spacing of the monitor wells from the injection well 20 may be on the order of 80 to 150 feet for the injection well 40, for example, and 700 to 1000 feet for the injection well 42. The geophone units 50 may be of a type commercially available such as from Tescorp Seismic Products Company, Houston, Tex. The spacing of the geophone units 50 may be on the range of 20 to 30 feet along the support tubings 48. The vertical coverage of the geophones may be predetermined in accordance with the expected vertical growth of the fracture 36. Vertical coverage or extent of the geophone arrays 51 and 52 may be on the order of 750 feet, for example.

Other geophone arrays may be employed, including the placement of oriented arrays of accelerometer or hydrophone sensors on the outer surfaces of the casings 44, for example. Moreover, the arrangement of the monitor wells 40 and 42 may include a third well with an accelerometer or geophone type sensor array disposed therein for a more accurate determination of the propagation and geometry of the fracture 36 including the thickness of the fracture and the overall height. However, those skilled in the art will recognize that the cost of the fracture monitoring system is directly proportional to the number of monitor wells provided and a reasonably accurate determination of the geometry of the fracture 36 be obtained using two wells disposed on opposite sides of the expected fracture plane 39.

Significant seismic activity has been observed in connection with the extension of hydraulic fractures in various earth formations. The extension of hydraulic fractures resulting from the injection of fluids into a formation zone occurs in several relatively small extensions or "jumps", each of which causes a micro-earthquake. If discrete, localized micro-earthquakes occur as the fracture extends away from a wellbore, both laterally (radially) and vertically, the amplitude of the seismic wave generated by these activities will typically be significant enough to be observed at locations remote from the fracture itself. Accordingly, by sensing and recording the seismic activity resulting from hydraulic fracture extension at various depths in one or more positions with respect to the fracture extension, this seismic activity can be used to determine the position of the micro-earthquake and, hence, the geometry of the fracture and its location.

In order to have a meaningful quantity of information to determine the location and geometry of a fracture, a substantial number of seismic signals must be continuously recorded from several stations over a period of time. For example, recording compressional or so-called P waves, as well as shear or so-called S waves, in conjunction with arrival times or otherwise an estimate of event locations may be provided using known seismic or earthquake monitoring methodology including a determination of the compressional and shear wave velocities of the formation in question. Moreover, the seismic activity resulting from hydraulic fracture extension must be discerned from "background noise" associated with signals generated by fluid movement through the injection well and within the existing portions of the fracture itself.

Still further, problems associated with the injection of waste materials into a subterranean formation arise if the propagation of the fracture cannot be monitored closely as this event occurs. In other words, if seismic activity is recorded and analyzed at a later time, the fracture may have extended out of the predetermined boundaries prescribed for the injection process. Accordingly, it is important to be, able to closely monitor fracture extension or propagation with minimal time delay so that action can be taken to cease or reduce fluid injection, for example, if fracture extension is indicated to be in a direction which might result in uncontrolled flow of the injection material into an unwanted zone. It is to this end, in particular, that the method of the present invention is directed to provide a so-called real-time monitoring of fracture propagation which includes the treatment of a significant number of signals received from the geophone arrays described and illustrated herein.

Figure 4:
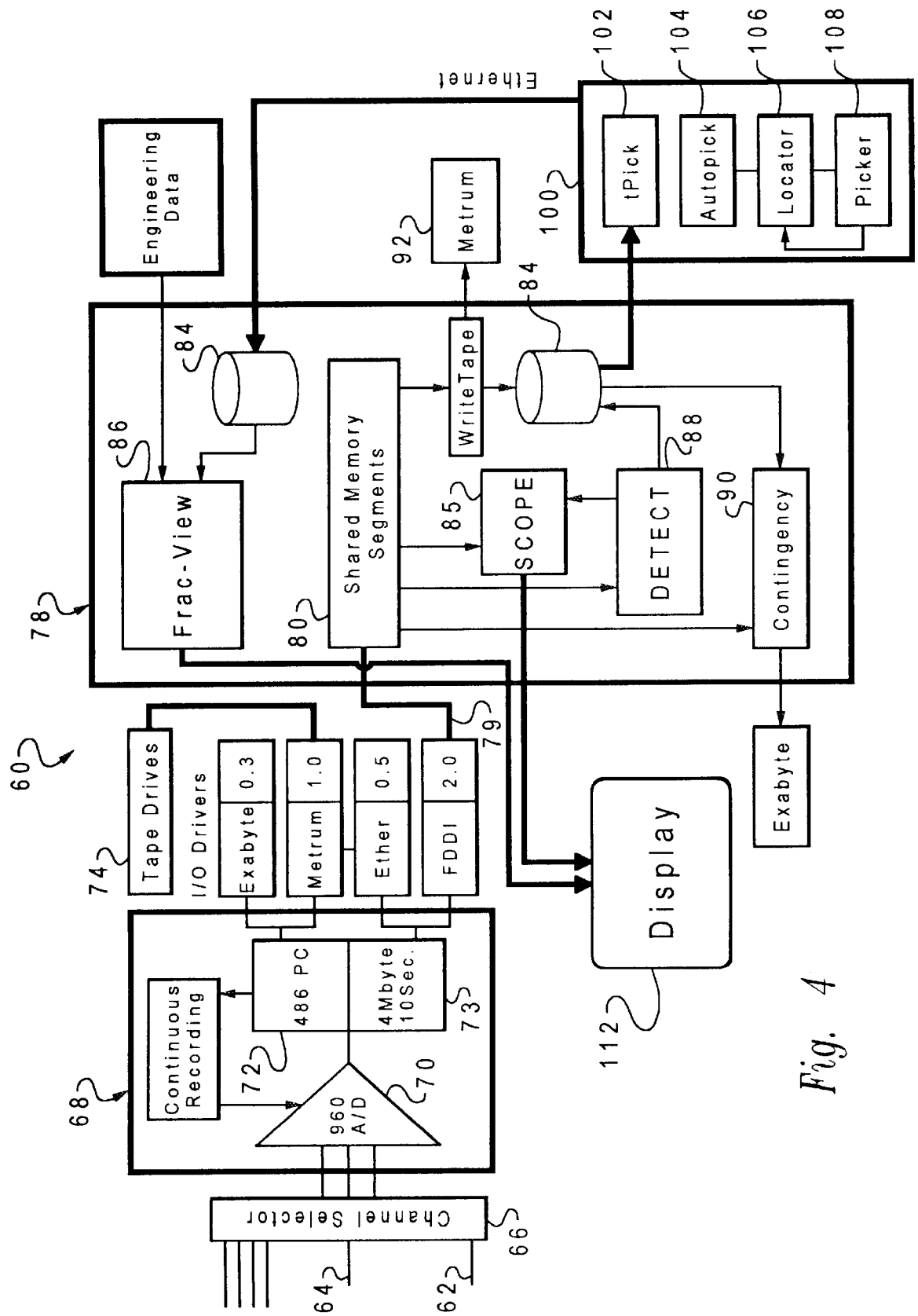
FIG. 4 is a diagram showing major components of the data recording and processing system of the present invention.

Referring now primarily to FIG. 4, signal carrying conductors 62 and 64 from each of the geophone arrays 51 and 52 extend from the respective wellheads 46 to the data processing system 60. FIG. 4 is a diagram of the major components of the system 60 which includes a suitable connector panel and channel selector 66 for connecting the individual conductor wires of the cabled conductors 62 and 64 to a data recording computer 68 which includes an analog to digital converter 70 and a central processing unit or CPU 72. The channel selector 66 may be configured to permit transmission of analog signals from selected ones of the geophone sensors 56 of each geophone pod to the converter 70. The analog signals directed to the converter 70 are irregular wave signals having a variable amplitude as a function of time. The converter 70 is adapted to continuously acquire signals from the geophone arrays 51 and 52, convert these signals to digital format and transmit the signals to the CPU 72 for further treatment. The CPU 72 is operable to be in communication with a suitable recording tape disposed in a storage device on tape recorder 74 for receiving the continuously converted and recorded data representing the seismic event signals. The tape recorder 74 may be of a type manufactured by Metrum Information Storage of Denver, Colo. as their Model RSP-2150, or Parity Systems, Inc. of Los Gatos, Calif. as their Model Exabyte 8500. The CPU 72 is provided with suitable input/output driver programs to transmit the data to the tape recorders 74.

Alternatively, the continuously recorded data representing the geophone signals may be transmitted via a buffer 73 to a network having a selected input/output driver program for transfer to a second computer 78. The computer 78 includes a ninety six megabyte random access memory 80 operable to receive data from the computer 68 via a network or data link 79 including a network designated Ethernet and an optical fiber data link illustrated by way of example and designated as FDDI. Suitable input/output driver programs may reside on the CPU 72 for transmitting data to the memory 80.

The computer 78 includes a suitable disk type data storage device 84 and processor capacity for storing and operating a graphical display program 86 also designated as FRAC-VIEW, a seismic display and quality control program 85 designated SCOPE, an event detector program 88 designated DETECT and a contingency program 90. A second tape recorder 92 is also operable to receive suitably acquired and organized data segments from the memory 80 as will be described in further detail herein.

The program 88 is operable to identify seismic events of a particular characteristic and transfer the signal data from the selected event to the storage disk 84. A third computer or central processing unit 100 may also be provided with the system 60 and having residing thereon certain programs 102, 104, 106 and 108 for further selecting signals representing seismic events of a particular characteristic and for calculating the location of the selected-event. Moreover, the resulting analysis of selected data carried out by the programs 102 through 108 may be stored on a suitable device such as the disk 84 for use in the FRAC-VIEW program 86. Certain engineering data may also be transferred to the FRAC-VIEW program 86 such as the rate of pumping of fluid into the injection well and the pressure of the fluid in the vicinity of the perforations 32. The computers or central processing units 68, 78 and 100 may, respectively, be commercially acquired from Oyo Limited of Houston, Tex., as their Model DAS1, Silicon Graphics, Inc., Sunnyvale, Calif., as their Model Indigo 2, and Sun Microsystems, Inc. of Sunnyvale, Calif. as their Model SUN 2. A suitable video monitor or display device 112 is also provided and operably connected to the computer 78 for displaying the output of the programs SCOPE and FRAC-VIEW.

Figure 5:
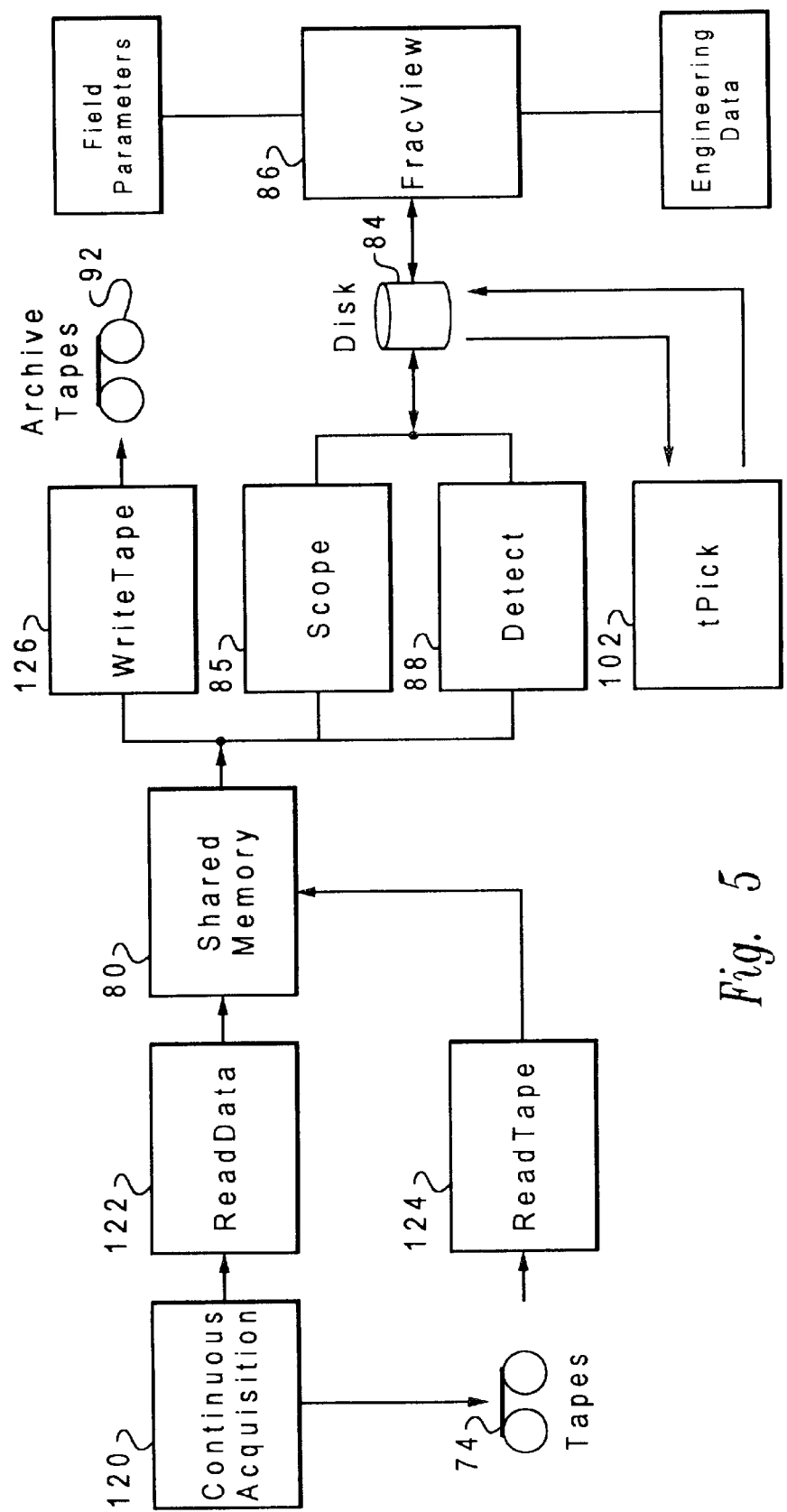
FIG. 5 is a diagram showing the major steps in the method of recording and analyzing data in accordance with the present invention.

Referring now to FIG. 5, there is illustrated a block diagram of the major steps in acquiring and operating on the data transmitted from the monitor wells 40 and 42. The computer or central processing unit 68 is operable to continuously acquire data transmitted by the multiconductor cables 62 and 64 and to prepare the data for transfer to the shared memory 80 and to a backup receiver in the form of the tape on the recorder 74. This process may be carried out by a continuous acquisition program, generally designated by the numeral 120. This program may reside on the CPU 72. The computer 78 is also operable to read the data acquired by the CPU 72 in segments of predetermined duration. For example, when sampling signals from 100 channels at 2000 samples per second data segments of ten seconds duration are obtained. A unique identifier is added to each data segment and the data segment is then transferred to the tape recorder 74 or to the computer 78 for placement in the shared memory 80. The shared memory 80 is operable to read the data storage tape of recorder 74 or to read the data segments directly. Suitable operating programs 122 and 124 may reside on the computer 78 for reading the data from the computer 68 or from the storage tape on recorder 74, respectively. A suitable program 126 may also reside on the computer 78 for transferring data from the shared memory 80 to the archive tapes 92.

Figure 6:
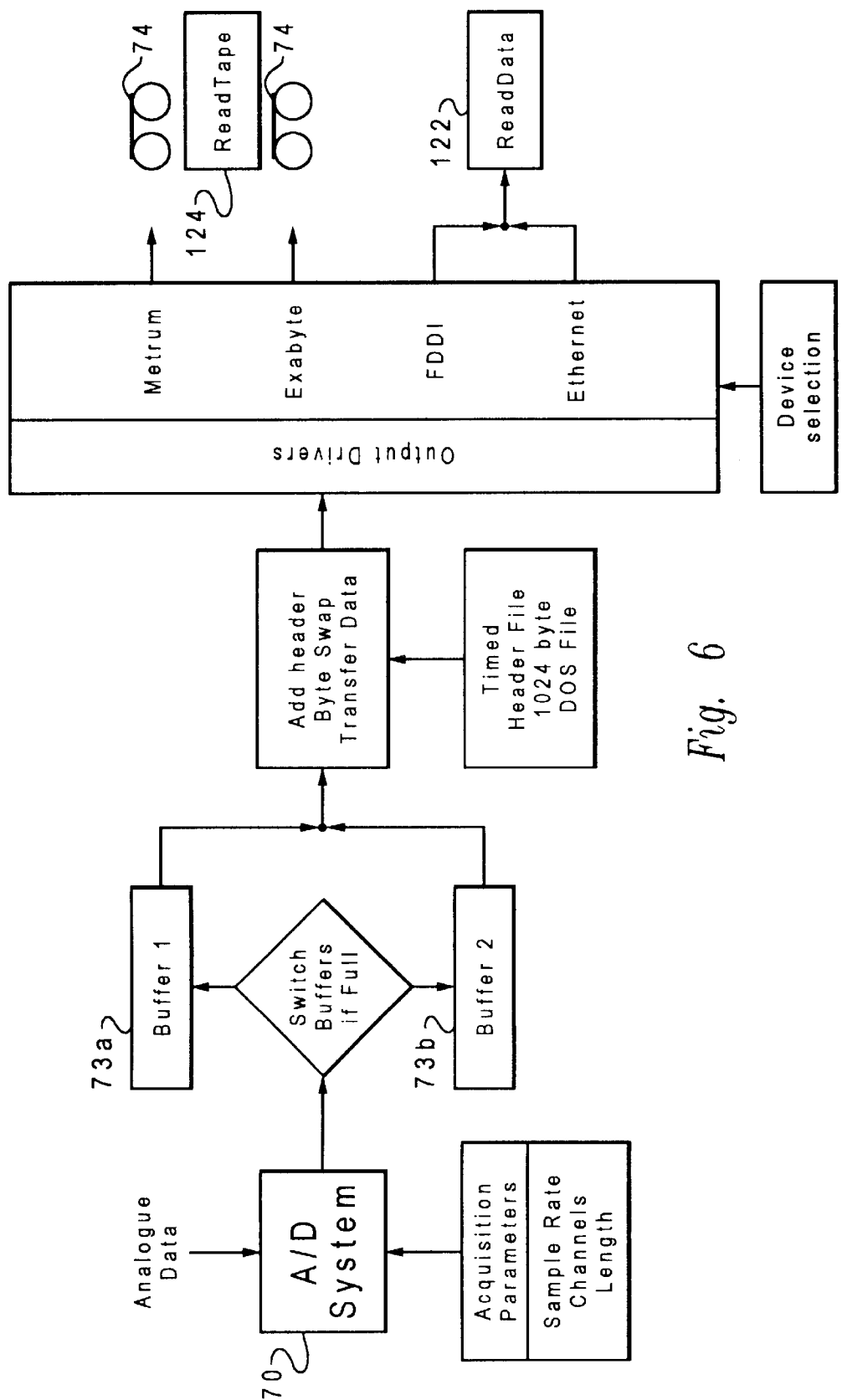
FIG. 6 is a diagram of the major steps in the method of continuously acquiring data.

Referring now to FIG. 6, there is illustrated a diagram showing the primary steps in acquiring data from the geophone arrays 51 and 52 and preparing the data for transfer to the tape on recorder 74 or to the computer 78 for further treatment. The converter 70 may be operated to receive analog signals from the cables 62 and 64 at a selected sample rate, from a predetermined number of channels or separate geophone sensors, and a predetermined signal length. For example, as many as 100 separate signals may be received by the converter 70 and converted to digital format at a rate up to 2000 samples per second, 2 bytes per word and data segments of ten seconds duration. The digital data, for example, may be transferred to the buffer 73, which has two buffer devices 73a and 73b, at 0.4 megabytes per second. Data is switched from one buffer device to the other if one device is already occupied by data. Data is transferred from the buffer 73 faster than the data segment length. For example, a ten second segment of data may be called from the buffer 73 and have an identifying header placed thereon before transfer to either the tape on recorder 74 or to the computer 78 for storage in the shared memory 80. Transfer of data to either the tape recorder 74 or to the computer 78 is preselected, and the data transfer is controlled by a driver program associated with the selected one of the recorder 74 or a selected data transfer network connected to the computer 78.

Figure 7:
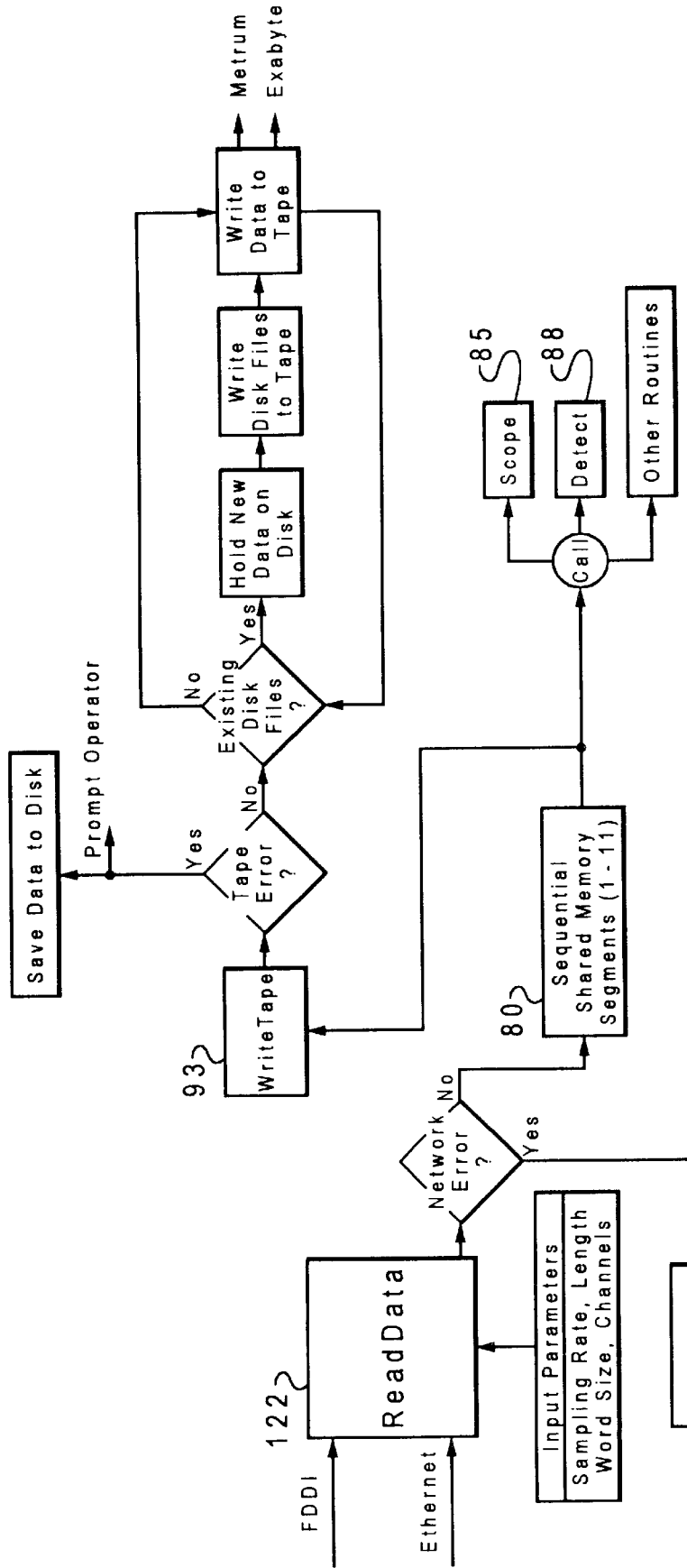
FIG. 7 is a diagram showing the major steps in the acquisition and recording of data into a shared memory and writing the data to archival tapes.

Referring now to FIG. 7, the steps of reading the data generated by the recording computer 68 and the transferring of the data to the shared memory 80 are diagrammed. A program resides on the computer 78 which is capable of accepting data from the buffer 73 by way of either of the networks FDDI or Ethernet. The sampling rate, word size, number of channels and record length may be further selected and transferred to the shared memory 80. The data is stored in the shared memory 80 in sequential plural segments, a total of eleven, for example, during reading of the data over either of the networks FDDI or Ethernet. If a network error is detected, a message may be transferred to the display 112, as indicated in FIG. 7. In accordance with an important aspect of the present invention, data are transferred from the shared memory 80 to an archival tape 92 for storage and may be called for analysis by the SCOPE or DETECT programs or any other routines which are capable of being carried out by the computer 78. Data transferred from the shared memory 80 to the archival tape 92 is controlled by the steps illustrated in FIG. 7 and by a WRITE TAPE program 93. If no tape error exists and no disk files exist, data are transferred to the tape 92. If a tape error is sensed, an operator prompting signal is provided and all data are temporarily stored on the storage disk 84 until the error is cleared. If disk files already exist, the new data are held on the disk and the existing files are first transferred to the tape 92.

Figure 8:
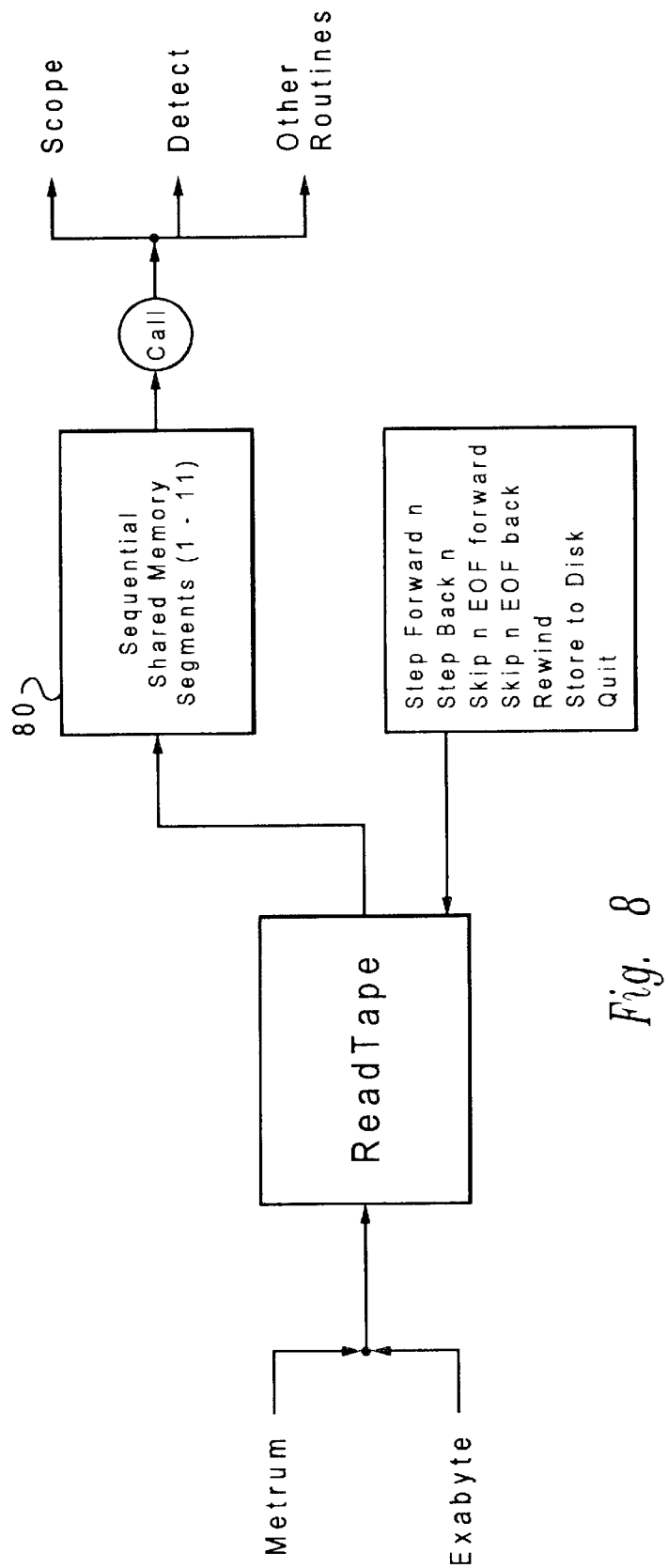
FIG. 8 is a diagram showing the steps in the method of reviewing stored data recorded on a tape medium.

The computer 78 is also operable to call one or the other of the tape recorders 74 to read the data thereon into the shared memory 80, as indicated in FIG. 8. A particular segment of data may be called from the recorders 74 by stepping either forward or back a selected number of segments, as indicated by the functions of the READ TAPE program identified in FIG. 8. The archival tape 92 may be transferred to recorders 74 for reading of the tape.

Figure 9:
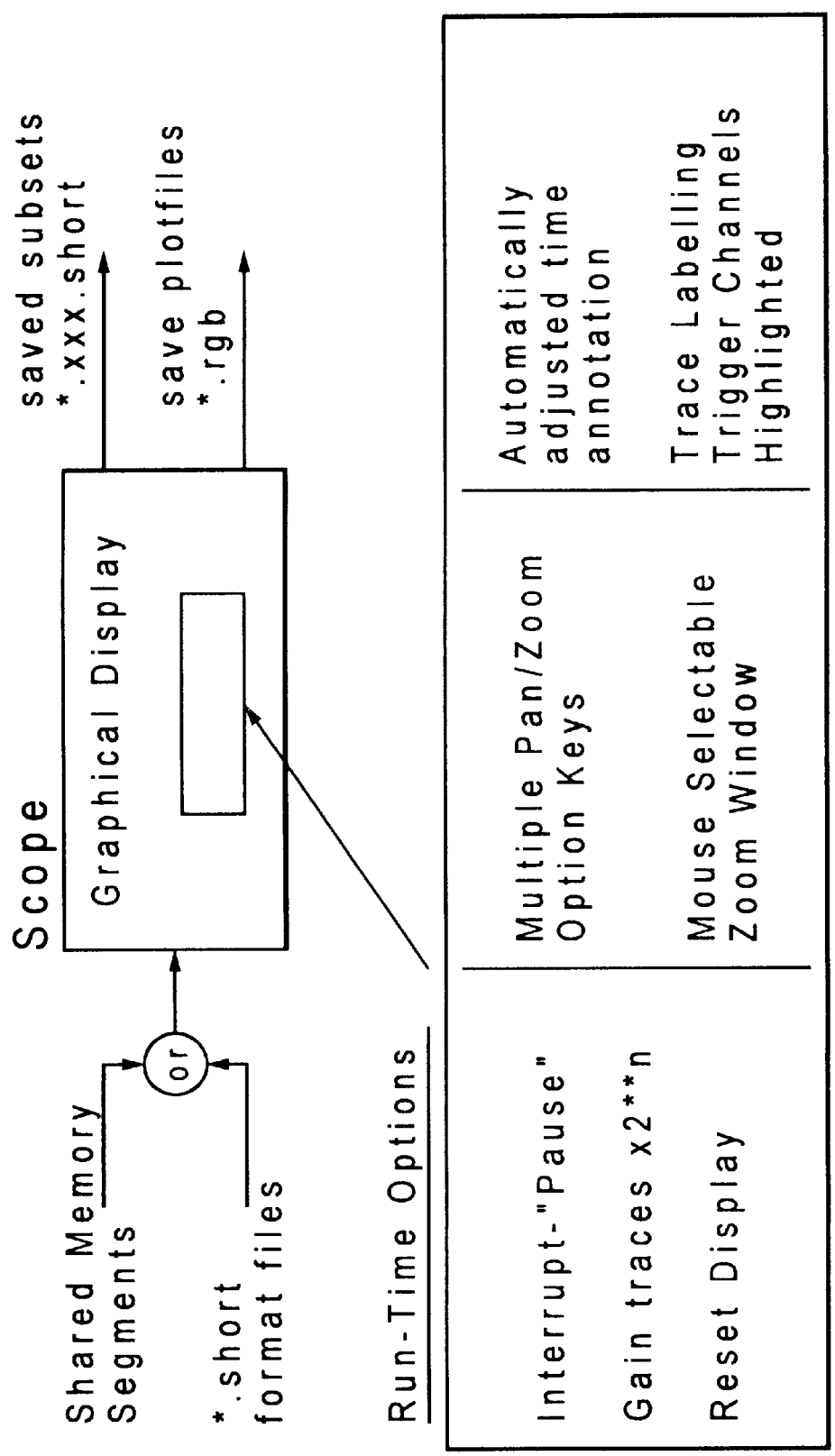
FIG. 9 is a diagram showing some of the features of a method for displaying data acquired and transmitted in accordance with the present invention.

Referring to FIG. 9, the major steps and options available are described for displaying data from each of the geophone signals selected. FIG. 9 describes certain features of the graphical display program 85 also identified herein as SCOPE. The SCOPE program 85 is operable to display data segments from the shared memory 80 or from the tape recorder 74, save subsets of the data segments for redisplay and to perform certain operations on the displayed data to enhance its readability.

Figure 10:
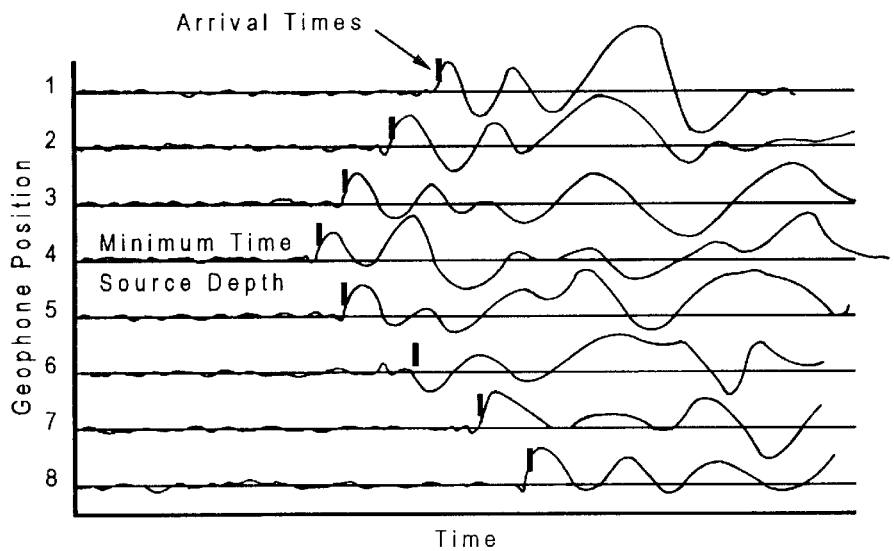
FIG. 10 is a diagram showing one typical display provided for the system and method of the present invention.
Figure 11:
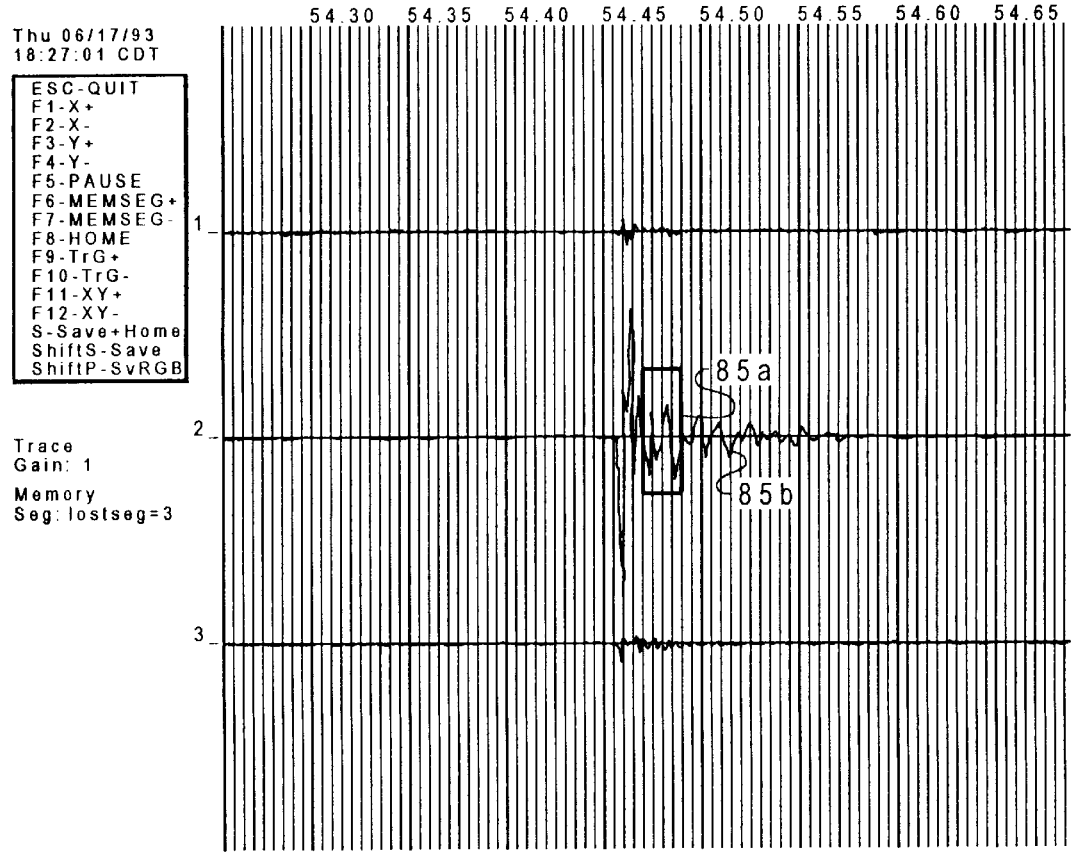
FIG. 11 is a diagram showing another example of a display of the data recorded and analyzed by the present invention.

For example, FIGS. 10 and 11 illustrate typical graphical displays of the selected data representing signals from selected geophones and displayed by the SCOPE program 85. FIG. 10 shows a display of signals from selected geophones at selected positions in the arrays 51 or 52 versus time. The geophone providing a signal of significant magnitude at the earliest time from the onset of the measurement period is indicative of the position of an event which typically represents the extension of the fracture 36. For example, if geophone position number 4 in FIG. 10, at a predetermined position in the array 51 or 52, receives a signal indicating a micro-earthquake before any of the other geophones in the array, this could be correlated with the height of the fracture extension event. Since the position of each of the geophones in the arrays 51 and 52 is known, the geophone receiving a particular seismic signal earlier than any other geophone would indicate the approximate depth of the event, such as a fracture propagation event.

Accordingly, data may be processed by the steps of FIG. 5 and displayed by the SCOPE program very rapidly with no further analysis to provide real time display of the location (depth) of the outermost edge of a fracture. In this way also, the geophone arrays 51 and 52 are used to sense not only the vertical growth of the fracture but also its lateral or radial growth from the injection well. In regard to the latter determination, since the location of the geophone arrays 51 and 52 is known, and the acoustic velocity of both compressional wave propagation and shear wave propagation can be determined for a particular formation, the position of the fracture growth event from the injection well can also be determined. FIG. 1 illustrates hot geophones 50b and 50c in the respective monitor wells 40 and 42 sense the micro-earthquake associated with the extension of the fracture 36 at the point 36a before any of the other geophones in the arrays 51 and 52 receive the seismic signal.

FIG. 11 illustrates another display that may be obtained with the transmission and manipulation of the data obtained from the shared memory 80 and depicted on the monitor or display 112 by the program 85. The display of FIG. 11 indicates the signals received by the geophones of a particular pod 55 where the geophones or channels are identified by numerals 1, 2 and 3. The irregular wave-type signal illustrated on geophone 2 is of significantly greater amplitude than that received on geophones numbers 1 and 3 from the same event. Knowing the orientation of geophone number 2 with respect to the injection well may be useful in indicating the location of the event, for example. The display of FIG. 11 is also a display of signal amplitude versus time with the time scale indicated covering approximately 0.50 seconds.

Data operated on by the computer 78 using the SCOPE program may be displayed in real time as acquired by the memory or retrieved from a tape on the recorder 74. In any case, as a data segment is replaced by a succeeding data segment, the signals displayed, such as indicated by the displays of either FIGS. 10 or 11, will be replaced by the displays of succeeding signals. These signals, while displayed, may have their display modified to amplify both the ordinate and abscissa values, for example. The signals displayed on the display 112 under the operation of SCOPE may be saved in any subset desired, the display may be reset, and the signal displayed may be maintained on the display 112 by an interrupt-"Pause" function of the SCOPE program. Still further, a mouse selectable zoom window may be provided to capture and amplify a portion of the data as displayed in FIG. 11, for example. Referring to FIG. 11, there is illustrated a window 85a for part of the signal trace 85b wherein the portion of the signal trace within the window 85a may be displayed by itself and subjected to the features of the SCOPE program, that is the amplification of the ordinate and abscissa. Still further, the SCOPE program is operable to automatically adjust the time annotation indicated in FIG. 11, for example, provide for labelling individual traces and for highlighting the channels which have received a signal or signals for a particular data segment.

Figure 12:
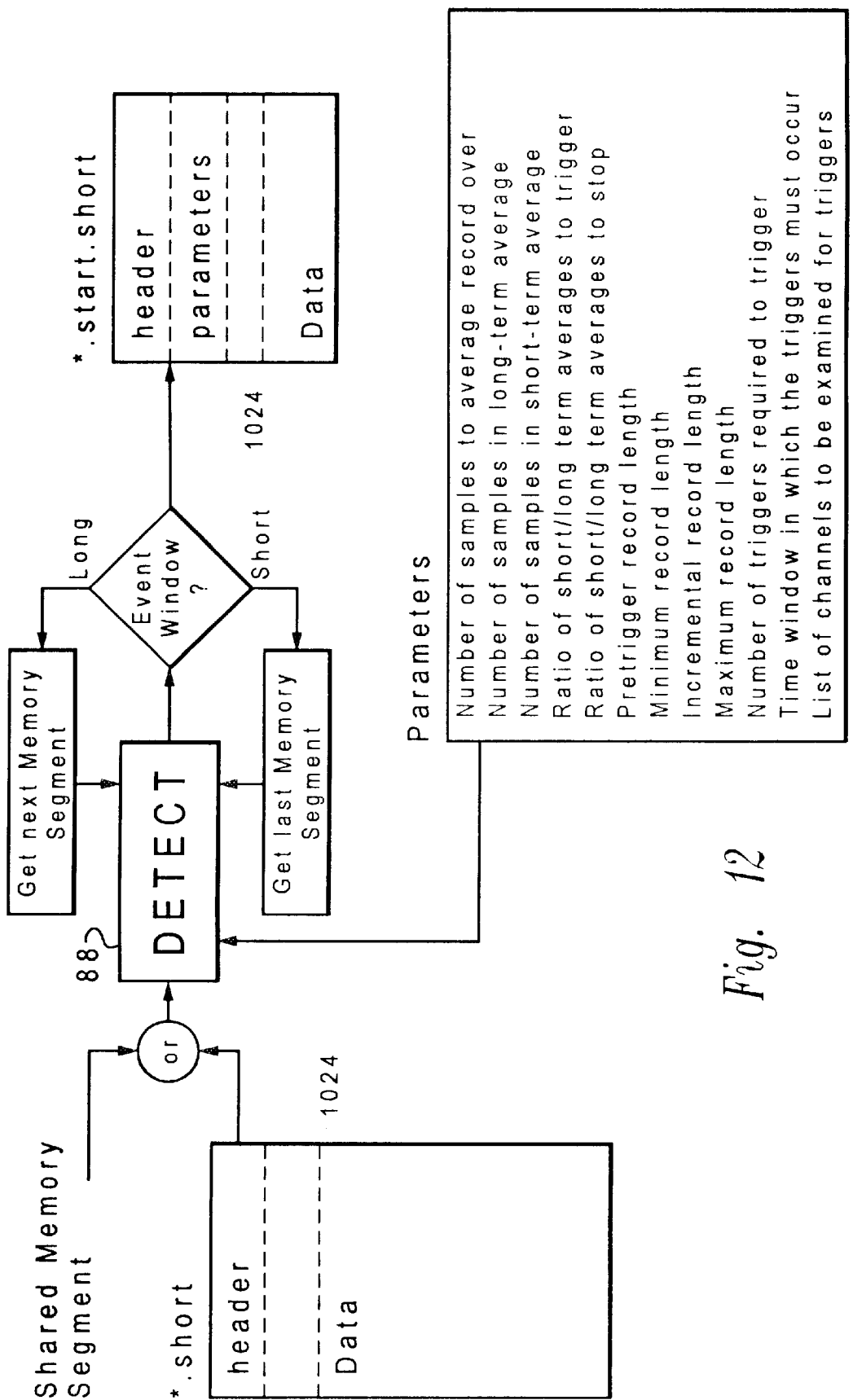
FIG. 12 is a diagram showing certain features of a method for identifying significant seismic events recorded by the system and method of the invention.

FIG. 12 illustrates some of the features of a micro-earthquake or seismic event detection method utilized in the present invention. The routine carried out by the program identified as DETECT is based on algorithms described in a treatise entitled "ASP: An Automated Seismic Processor for Micro-Earthquake Networks", McEvilly and Majer, The Bulletin of the Seismological Society of America, Volume 72, No. 1, pp. 303–325, February, 1982. The DETECT program is operable, for selected channels or signals to identify valid events based on the time and amplitude of the signals received by the geophone sensors of each pod and each array. The parameters, which are selectable to "screen out" invalid events and to save so-called valid events, are identified in FIG. 12 and are further explained in the above reference. Each memory segment may be analyzed as to how many, if any, valid events are sensed and those valid events which are identified are then given a unique identifying header and forwarded to a storage medium such as the disk 84. As indicated in FIG. 2, the DETECT program may also receive data from a source other than the shared memory 80.

Figure 13:
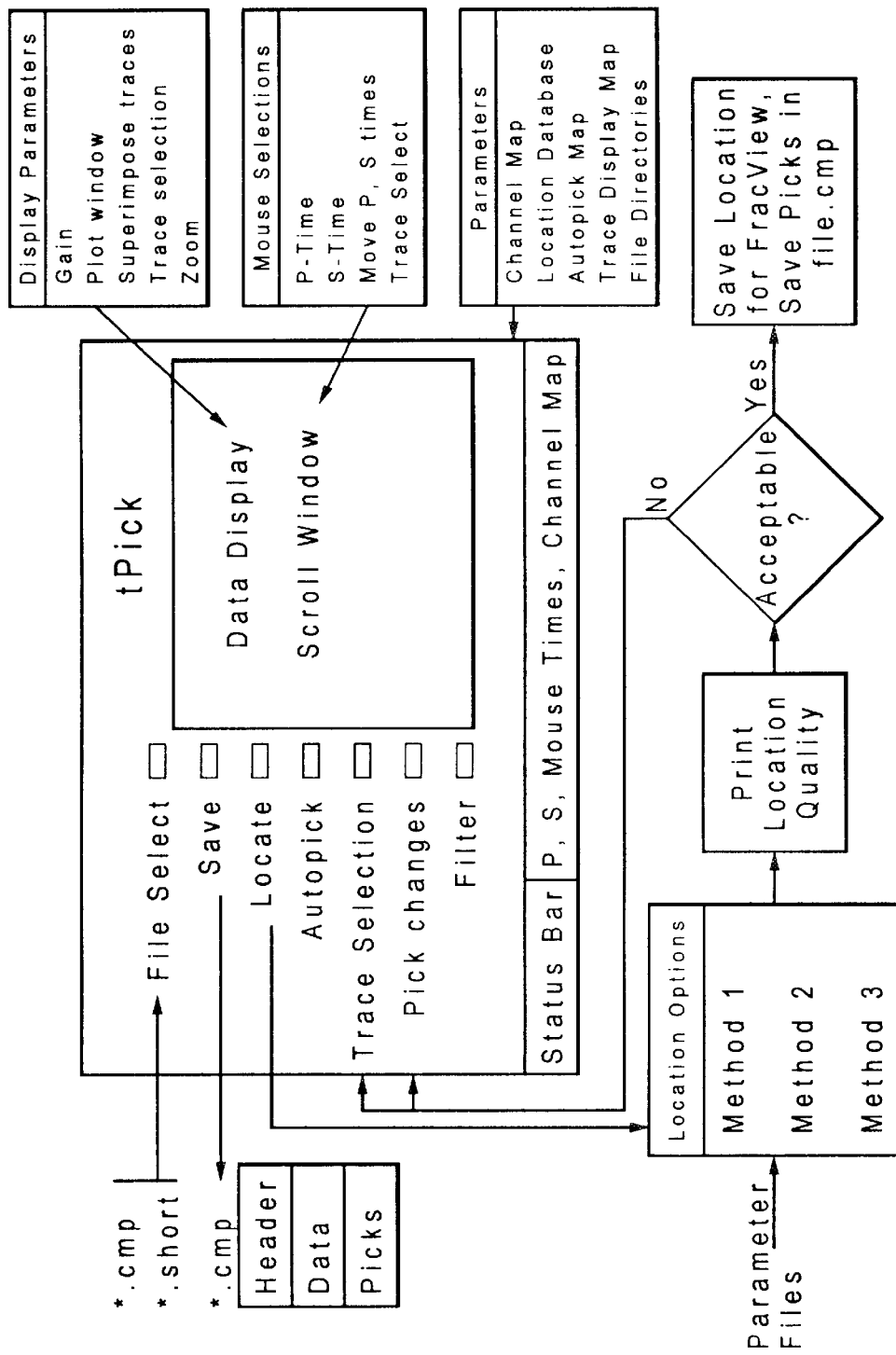
FIG. 13 is a diagram showing certain features of an interactive event timing and location method in conjunction with the present invention.

FIG. 13 depicts the parameters of further steps in the method of locating and displaying selected events which have been identified by the method of the DETECT program. Those events identified by the DETECT program may be displayed, superimposed on each other and magnified for visual analysis. Those events which are identified as possible seismic events may also have their location identified using one or more methods known in the art including the so-called HODOGRAM analysis based on three component geophone sensor recordings, the time difference between the arrival of a P wave and an S wave and the velocity of P waves and S waves in the particular formation zone being monitored. An alternative event location program utilizes an error minimizing method of determining the position of an event based on seismic arrival times at the monitor wells 40 and 42. Still further, the seismic event may be located using an algorithm developed by the U.S. Geological Survey.

Figure 14:
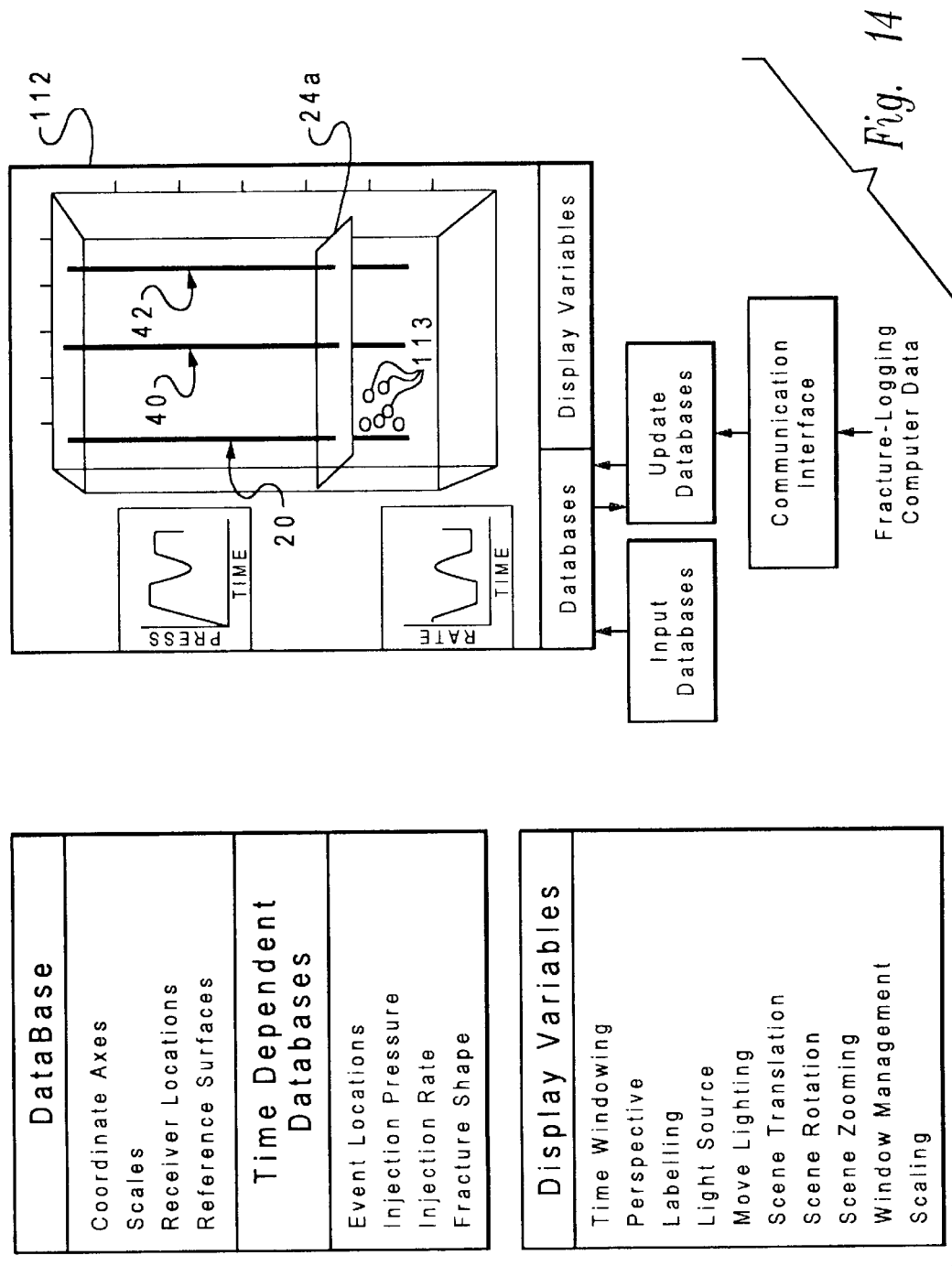
FIG. 14 is a diagram showing certain features of a graphical display of events indicating the location of the event with respect to a well and a barrier plane adjacent to a formation in which a fracture is being extended.

FIG. 14 shows one method of displaying the located events using the data screened by the DETECT or SCOPE programs and by one or more of the location methods described above. The display 112 shows, in FIG. 14, the injection well 20, the monitor wells 40 and 42 and the upper boundary layer 24a defining the zone 24. Event locations identified by the DETECT or SCOPE programs are displayed at positions 113, which may take the form of small ellipsoids using the calculation methods described. The T-pick program is operable to select the number of signals identified by the DETECT or SCOPE program for treatment by the event location calculation method selected. The FRAC VIEW program 86 is operable to provide the three-dimensional display indicated in FIG. 14. Well trajectories, the earth's surface and downhole geophone locations, as well as the located seismic events indicated by the numerals 113 may be displayed in a three-dimensional display that can be zoomed, translated or rotated in any direction and with illumination. The seismic events displayed at 113 have a size scaled to the uncertainty of location, that is small ellipsoids indicating greater confidence in the hypo central location. The display is particularly effective in communicating the complicated geometry of fractures extending from a disposal or injection well to persons unfamiliar with data related to seismic events.

Those skilled in the art will recognize from the foregoing description that a unique method and system of monitoring hydraulic fracture extension or propagation in a predetermined earth formation zone of interest may be carried out with the method described above. Although a preferred embodiment has been described in some detail, those skilled in the art will also recognize that various substitutions and modifications may be made without departing from the scope and spirit of the invention as recited in the appended claims.

What is claimed is:

1. A method for determining the location of a hydraulic fracture extension within an earth formation zone of interest in real time wherein said hydraulic fracture is extendable from a fluid injection well in said earth formation, comprising the steps of:

determining an azimuth defining an expected direction of extension of said hydraulic fracture from said injection well;

injecting fluid comprising fluid wastes or a slurry of particulate solids into said injection well to extend a fracture from said injection well while simultaneously sensing micro-earthquake events resulting from extension of said fracture;

placing a plurality of seismic event sensors at predetermined positions with respect to said injection well; said sensors providing signals to a real-time signal monitoring system including means for displaying signals from selected ones of said sensors at a predetermined minimum time after the occurrence of said events;

converting a selected number of signals from said sensors to digital format, momentarily storing said digital signals and transferring said digital signals, at will, to one of a signal storage device and an electronic memory device;

identifying each of a predetermined number of said signals as a function of time prior to transferring said signals to said one of said storage device and said memory device;

retrieving from said memory device a selected number of signals which have a predetermined amplitude for a predetermined time;

transmitting said selected signals to another storage device and displaying said signals; and determining a boundary point of said fracture with respect to the position of at least one of said sensors which receives a seismic signal caused by extension of said fracture earlier than said seismic signal is received by others of said sensors and displaying the location and extension of said fracture.

2. The method set forth in claim 1 including the step of:

determining the location of a fracture propagation event based on said selected signals and displaying the location of origin of said selected signals with respect to the location of at least one of said injection well and a boundary of a formation zone of interest.

3. A process for real time management and verification of geologic containment of hazardous wastes injected into at least one subterranean hydraulic fracture, comprising the steps of:

a. Arranging and installing an array of high sensitivity, high resolution seismic sensors about a selected subterranean injection zone and a disposal well for injection disposal of hazardous wastes; wherein said sensors are installed in boreholes, drilled to a selected depth; wherein said sensors provide known sensor observation points for maximum practical coverage of said selected injection zone; wherein said sensors comprise means for detecting and receiving passive seismic signals from micro-earthquake events in said selected injection zone as described in step (g) below; and making precise measurement of location coordinates of said sensor observation points;

b. Connecting said sensors to a computer-based, real time, automatic seismic data processing system:

(1) Wherein said computer-based system comprises means for automatic processing of passive seismic signal data, on a real time basis, during fracturing in the selected injection zone at a given site; and (2) Wherein said computer-based system further comprises means for real time compression of passive seismic signal data, simultaneously receiving, recognizing, recording and processing continuously, signal data from as many as 50 channels or more of data at rates of 2,000 signals per second, per sensor, or greater, and for detecting, flagging, and recording precise measurements of arrival times of both primary and secondary wave phases of passive seismic signals on a real time basis as received, with only signal segments retained for further processing;

c. Determining precise velocities of seismic signals traveling through underground strata in and above said injection zone, wherein said determination comprises measuring origin times and arrival times of signals generated by perforation of said disposal well, as said signals travel from a known location of said perforation to said known sensor observation points;

d. Calibrating a best seismic velocity distribution model of said selected injection zone, wherein said calibration comprises the steps of:
  (1) Making static corrections to observed seismic event arrival times to account for model bias;
  (2) Calculating theoretical hypocenter locations using the hypocenter location routine from step 1 below, and a range of hypothetical velocities;
  (3) Comparing said theoretical hypocenter locations with known locations of said perforation shots; and
  (4) Selecting a best velocity distribution model which gives calculated locations which are closest to known shot locations;

e. Pumping and injecting a slurry suitable for hydraulic fracturing and injection and comprising said hazardous wastes mixed with a selected liquid transport agent, wherein said slurry is injected through said perforation at pressures exceeding minimum principle stress of formations of said injection zone to cause controlled fracturization wherein hydraulic fractures are created in said formation which grow and propagate as additional slurry is injected; and continuing to inject said slurry into fractures as generated in the selected injection zone at controlled rates while monitoring and controlling down-hole pressure and flow rates to ensure efficient and complete disposal of a required volume of said hazardous wastes;

f. Wherein said injecting and fracturization causes changes in local geologic effective stresses which trigger micro-earthquakes; wherein said micro-earthquakes at the instant of fracture trigger weak passive seismic signals from the source of each said micro-earthquake event; wherein said passive seismic signals travel through said formations to said sensors; and wherein the sources of said passive seismic signals are known to be located within and acceptably close to said hydraulic fractures clustering in a narrow ellipsoidal volume of rock which encloses said induced fracture or network of fractures;

g. Receiving said passive seismic signals, at each said sensor; converting them to analog electrical signals; and transmitting them as received to said processing system;

h. Amplifying and digitizing said analog signals, wherein a separate channel of data is produced from each sensor;

i. Automatically detecting, measuring, and recording said digital data using a real time signal detection algorithm;
  (1) Wherein, whenever the signal energy level of a channel exceeds the background noise level by a preset ratio, a signal is recognized and declared; and
  (2) Wherein arrival time and amplitude of said signal are measured and recorded;

j. Determining and recording, on a real time basis, which signals and arrival times are associated from the same micro-earthquake event, based on said known sensor locations and velocities in the selected injection zone;

k. Sorting and identifying said associated signals for real time, positive identification and recording of their phase types, which may be either primary waves or secondary waves; and recording precise arrival times of said primary and secondary waves at each of said sensors;

l. Determining a hypocenter location and an origin time for signals from each said micro-earthquake event in real time as said events occur, based on hypocenter location data with an earthquake hypocenter location program;

m. Recording a hypocenter location and an origin time for each said micro-earthquake event in an event list in real time, wherein said list is continually updated with a new location and origin time of each said micro-earthquake event as said events occur;

n. Automatically calculating moment tensor source mechanisms for each event, by means comprising said signal amplitudes for each said event; determining if said event has a tensional source, which indicates it is part of the hydraulic fracture, or a shear source, which indicates it is adjacent to but not in the hydraulic fracture and thus contains no waste slurry; and recording each said tension source by type and location;

o. Determining orientation azimuth of the micro-fracture plane associated with each said event based on said moment sensors;

p. Creating and displaying an animated visualization image, using means comprising computer codes and real time event locations, source mechanisms and orientations, wherein said visualization image comprises:
  (1) Displaying a rotatable, animated, three dimensional, real time visualization of said hypocenter location distributions, wherein a distinction is made between hypocenter locations based on said source mechanisms; wherein said animated visualization is provided with high resolution;
  (2) Animating said visualization in real time;
  (3) Accurately imaging and visually displaying development, growth, propagation, direction and velocity of induced fractures in real time as said injection continues;
  (4) Displaying said animated visualization on a large screen television for viewing;
  (5) Rotating said three dimensional display on said screen as desired to show any desired cross section and map view;
  (6) Displaying predicted fracture geometry and comparing it with current actual geometry as displayed in real time during said injection; wherein said predicted fracture geometry is constantly updated on a real time basis to provide a continuing updated prediction and model of future growth; and
  (7) Displaying said fracture growth in real time displayed within a real time animated image of the local geology, in spatial relationship to other geologic formations, zones, reservoirs, wells, fractures and sources of potable water, and simultaneously providing the observer with a continuously updated visual image and display of data concerning the properties of the disposal operation including pressure, slurry volume, flow rate, and viscosity, as said injection continues;

q. Depicting and displaying said visual image and display of data with different colors or symbols in said animated visualization:
  (1) Wherein the areal extent of said displayed sources provides a real time demonstration of the location and extent of waste filled fractures;
  (2) Wherein said animated visualization provides a real time verification that said fracture is contained in said selected injection zone; and
  (3) Wherein a direction and a velocity of any migration of seismic activity toward a sensitive zone is immediately evident, permitting management decisions and actions including shut down or modification of injection flow rates and pressures to be accomplished long before said sensitive zone is threatened.

4. A work station device for real time passive seismic imaging and management of disposal of hazardous wastes by injection into at least one subterranean hydraulic fracture with verification of geologic containment, comprising:
  a. Means for arranging and installing an array of high sensitivity, high resolution seismic sensors about a selected subterranean injection zone and disposal well for injection disposal of hazardous wastes; wherein said sensors are installed in boreholes, drilled to a selected depth, wherein said sensors provide known sensor observation points for maximum practical coverage of said selected injection zone; wherein said sensors comprise means for detecting and receiving passive seismic signals from micro-earthquake events in said selected injection zone as described in step (g) below; and making precise measurement of location coordinates of said sensor observation points;
    (1) Wherein said computer-based system comprises means for automatic processing of passive seismic signal data, on a real time basis during fracturing in the selected injection zone at a given site; and
    (2) Wherein said computer-based system further comprises means for real time compression of passive seismic signal data, simultaneously receiving, recognizing, recording and processing continuously, signal data from as many as 50 channels or more of data at rates of 2,000 signals per second, per sensor, or greater, and for detecting, flagging, and recording precise measurements of arrival times of both primary and secondary wave phases of passive seismic signals on a real time basis as received, with only signal segments retained for further processing;
  c. Means for determining precise velocities of seismic signals traveling through underground strata in and above said injection zone, wherein said determination comprises measuring origin times and arrival times of signals generated by perforation of said disposal well, as said signals travel from a known location to said perforation to said known sensor observation points;
  d. Means for calibrating a best seismic velocity distribution model of said selected injection zone, wherein said calibration comprises the steps of:
    (1) Making static corrections to observed seismic event arrival times to account for model bias;
    (2) Calculating theoretical hypocenter locations using the hypocenter location routine from step 1 below, and a range of hypothetical velocities;
    (3) Comparing said theoretical hypocenter locations with known locations of said perforation shots; and
    (4) Selecting a best velocity distribution model which gives calculated locations which are closest to known shot locations;
  e. Means for pumping and injecting a slurry suitable for hydraulic fracturing and injection and comprising said hazardous wastes mixed with a selected liquid transport agent, wherein said slurry is injected through said perforation at pressures exceeding minimum principle stress of formations of said injection zone to cause controlled fracturization wherein hydraulic fractures are created in said formation which grow and propagate as additional slurry is injected; and continuing to inject and slurry into fractures as generated in the selected injection zone at controlled rates while monitoring and controlling down-hole pressure and flow rates to ensure efficient and complete disposal of a required volume of said hazardous wastes;
  f. Wherein said injecting and fracturization causes changes in local geologic effective stresses which trigger micro-earthquakes; wherein said micro-earthquakes at the instant of fracture trigger weak passive seismic signals from the source of each said micro-earthquake event; wherein said passive seismic signals travel through said formations to said sensors; and wherein the sources of said signals are known to be located within and acceptably close to said hydraulic fractures clustering in a narrow ellipsoidal volume of rock which encloses said hydraulic fracture or network of fractures;
  g. Means for receiving said passive seismic signals, at each said sensor; converting them to analog electrical signals; and transmitting them as received to said processing system;
  h. Means for amplifying and digitizing said analog signals, wherein a separate channel of data is produced from each sensor;
  i. Means for automatically detecting, measuring, and recording said digital data using a real time signal detection algorithm:
    (1) Wherein, whenever the signal energy level of a channel exceeds the background noise level by a preset ratio, a signal is recognized and declared; and
    (2) Wherein arrival time and amplitude of said signal are measured and recorded;
  j. Means for determining and recording, on a real time basis, which signals and arrival times are associated from the same micro-earthquake event, based on said known sensor locations and velocities in the selected injection zone;
  k. Means for sorting and identifying said associated signals for real time, positive identification and recording of their phase types, which may be either primary waves or secondary waves; and recording precise arrival times of said primary and secondary waves at each of said sensors;
  l. Means for determining a hypocenter location and an origin time for signals from each said micro-earthquake event in real time as said events occur, based on hypocenter location data and an earthquake hypocenter location program;
  m. Means for recording a hypocenter location and an origin time for each said micro-earthquake event in an event list in real time, wherein said list is continually updated with a new location and origin time of each said micro-earthquake event as said events occur;
  n. Means for automatically calculating moment tensor source mechanisms for each event, based on said signal amplitudes for each said event; determining if said event has a tensional source, which indicates it is part of the hydraulic fracture, or a shear source, which indicates it is adjacent to but not in the hydraulic fracture and thus contains no waste slurry; and recording each said tension source by type and location;

o. means for determining orientation azimuth of the micro-fracture plane associated with each said event based on said moment sensors;

p. Means for creating and displaying an animated visualization image, using computer codes and said real time event locations, source mechanisms and orientations, wherein said visualization image comprises:
   (1) Displaying a rotatable, animated, three dimensional, real time, visualization of said hypocenter location distributions, wherein a distinction is made between hypocenter locations based on said source mechanisms; wherein said animated visualization is provided with high resolution;
   (2) Animating said visualization in real time;
   (3) Accurately imaging and visually displaying development, growth, propagation, direction and velocity of induced fractures in real time as said injection process continues;
   (4) Displaying said animated visualization on large screen television for viewing;
   (5) Rotating said three dimensional display on said screen as desired to show any desired cross section and map view;
   (6) Displaying predicted fracture geometry and comparing it with current actual geometry as displayed in real time during said injection; wherein said predicted fracture geometry is constantly updated on a real time basis to provide a continuing updated prediction and model of future growth; and
   (7) Displaying said fracture growth in real time displayed within a real time animated image of the local geology, in spatial relationship to other geologic formations, zones, reservoirs, wells, fractures and sources of potable water, and simultaneously providing the observer with a continuously updated visual image and display of data concerning the properties of the disposal operation including pressure, slurry volume, flow rate, and viscosity, as said injection continues;

q. Means for depicting and displaying said visual image and display with different colors or symbols in said animated visualization:
   (1) Wherein the areal extent of said displayed sources provides a real time demonstration of the location and extent of waste filled fractures;
   (2) Wherein said animated visualization provides a real time verification that said fracture is contained in said selected injection zone; and
   (3) Wherein a direction and a velocity of any migration of seismic activity toward a sensitive zone is immediately evident, permitting management decisions and actions including shut down or modification of injection flow rates and pressures to be accomplished long before said sensitive zones are threatened; and r. Means for integrating a data installing, receiving, acquisition, compression, processing, calculating, determining and visualization means into a modularized work station system for in-process management and control of hydraulic fracture treatments and for verification of geologic containment of hydraulic fractures.

5. A process for real time management and verification of geologic containment of hazardous wastes injected into at least one subterranean hydraulic fracture, comprising the steps of:

a. Arranging and installing an array of high sensitivity, high resolution seismic sensors about a selected subterranean injection zone and disposal well for injection disposal of hazardous wastes; wherein said sensors are installed in boreholes, drilled to a selected depth; wherein said sensors provide known sensor observation points for maximum practical coverage of said selected injection zone; wherein said sensors comprise means for detecting and receiving passive seismic signals from micro-earthquake events in said selected injection zone as described in step (g) below; and making precise measurement of location coordinates of said sensor observation points;

b. Connecting said sensors to a computer-based, real time, automatic seismic data processing system:
   (1) Wherein said computer-based system comprises means for automatic processing of passive seismic signal data, on a real time basis, continuously during fracturing in the selected injection zone at a given site; and
   (2) Wherein said computer-based system further comprises means for real time compression of passive seismic signal data, simultaneously receiving, recognizing, recording and processing continuously, signal data from as many as 50 channels or more of data at rates of 2,000 signals per second, per sensor, or greater, and for detecting, flagging, and recording precise measurements of arrival times of both primary and secondary wave phases of passive seismic signals on a real time basis as received, with signal segments retained for further processing;

c. Determining precise velocities of seismic signals traveling through underground strata in and above said selected injection zone;

d. Calibrating a best seismic velocity distribution model of said strata;

e. Pumping and injecting a slurry suitable for hydraulic fracturing and injection, wherein said slurry is injected into said selected injection zone at pressures exceeding minimum principle stress of formations of said injection zone to cause controlled fracturization wherein hydraulic fractures are created in said formation which grow and propagate as additional slurry is injected; and continuing to inject said slurry into fractures as generated in said selected injection zone at controlled rates while monitoring and controlling down-hole pressure and flow rates to ensure efficient and complete disposal of a required volume of said slurry;

f. Wherein said injecting and fracturization causes changes in local geologic effective stresses which trigger micro-earthquake events; wherein said micro-earthquake events at the instant of fracture trigger weak passive seismic signals from the source of each said micro-earthquake event;

g. Receiving said passive seismic signals, at each said sensor; converting them to analog electrical signals; and transmitting them as received to said processing system;

h. Amplifying and digitizing said analog signals, wherein a separate channel of data is produced from each said sensor;

i. Detecting, measuring, and recording said digital data using a real time signal detection algorithm;

j. Determining and recording, on a real time basis, which signals and arrival times are associated from the same micro-earthquake event, based on said known sensor locations and velocities in the selected injection zone;

k. Sorting and identifying said associated signals for real time, positive identification and recording of their phase types, which may be either primary waves or secondary waves; and recording precise arrival times of said primary and secondary waves at each of said sensors;

l. Determining a hypocenter location and an origin time for signals from each said micro-earthquake event in real time as said events occur, based on hypocenter location data with an earthquake hypocenter location program;

m. Recording a hypocenter location and an origin time for each said micro-earthquake event in an event list in real time, wherein said list is continually updated with a new location and origin time of each said micro-earthquake event as said events occur;

n. Creating and displaying a visualization image, using means comprising computer codes and said real time event locations, wherein said visualization image comprises:
  (1) Displaying a rotatable, three dimensional, real time visualization of said hypocenter location distributions, wherein said visualization is provided with high resolution;
  (2) Accurately imaging and visually displaying development, growth, propagation, direction and velocity of induced fractures in real time as said injection continues;
  (3) Displaying said visualization;
  (4) Rotating said three dimensional visualization on said screen as desired to show any desired cross section and map view;
  (5) Displaying predicted fracture geometry and comparing it with current actual geometry as displayed in real time during said injection; wherein said predicted fracture geometry is updated on a real time basis to provide continuing updated predictions and models of future growth; and
  (6) Visualizing said fracture growth in real time displayed within an image of the local geology, in spatial relationship to other geologic formations, zones, reservoirs, wells, fractures and sources of potable water, and simultaneously providing the observer with a continuously updated visual image and display of data concerning the properties of the disposal operation including pressure, slurry volume, flow rate, viscosity, as injection continues;

o. Depicting and displaying a map visualization:
  (1) Wherein the areal extent of said fractures provides a real time demonstration of the location and extent of fractures;
  (2) Wherein said map provides real time verification that said fractures are contained in said selected injection zone; and
  (3) Wherein the direction and velocity of any migration of seismic activity toward a sensitive zone is immediately evident, permitting management decisions and actions including shut down or modification of injection flow rates and pressures to be accomplished.

6. A word station device for real time passive seismic imaging and management of disposal of hazardous wastes by injection into subterranean hydraulic fractures with verification of geologic containment, comprising:
  a. Means for arranging and installing an array of high sensitivity, high resolution seismic sensors about a selected subterranean injection zone and disposal well for injection disposal of hazardous wastes; wherein said sensors are installed in boreholes, drilled to a selected depth, wherein said sensors provide known sensor observation points for maximum practical coverage of said selected injection zone; wherein said sensors comprise means for detecting and receiving passive seismic signals from micro-earthquake events in said selected injection zone as described in step (g) below; and making precise measurement of location coordinates of said sensor observation points;
  b. Means for connecting said sensors to a computer-based, real time, automatic seismic data processing system:
    (1) Wherein said computer-based system comprises means for automatic processing of passive seismic signal data, on a real time basis, during fracturing in the selected injection zone at a given site; and
    (2) wherein said computer-based system further comprises means for real time compression of passive seismic signal data, simultaneously receiving, recognizing, recording and processing continuously, signal data from as many as 50 channels or more of data at rates of 2,000 signals per second, per sensor, or greater, and for detecting, flagging, and recording precise measurements of arrival times of both primary and secondary wave phases of passive seismic signals on a real time basis as received, with signal segments retained for further processing;
  c. Means for determining precise velocities of seismic signals traveling through underground strata in and above said selected injection zone;
  d. Means for calibrating a best seismic velocity distribution model of said strata;
  e. Means for pumping and injecting a slurry suitable for hydraulic fracturing and injection, wherein said slurry is injected into said selected injection zone at pressures exceeding minimum principle stress of formations of said injection zone to cause controlled fracturization wherein hydraulic fractures are created in said formation which grow and propagate as additional slurry is injected; and continuing to inject said slurry into fractures as generated in said selected injection zone at controlled rates while monitoring and controlling down-hole pressures and flow rates;
  f. Wherein said injecting and fracturization causes changes in local geologic effective stresses which trigger micro-earthquake events; wherein said micro-earthquake events at the instant of fracture trigger weak passive seismic signals from the source of each said micro-earthquake event;
  g. Means for receiving said passive seismic signals, at each said sensor; converting them to analog electrical signals; and transmitting them as received to said processing system;
  h. Means for amplifying and digitizing said analog signals, wherein a separate channel of data is produced from each sensor;
  i. Means for automatically detecting, measuring, and recording said digital data using a real time signal detection algorithm;
  j. Means for determining and recording, on a real time basis, which signals and arrival times are associated from the same micro-earthquake event, based on said known sensor locations and velocities in the selected injection zone;
  k. Means for sorting and identifying said associated signals for real time, positive identification and recording of their phase types, which may be either primary waves or secondary waves; and recording precise arrival times of said primary and secondary waves at each of said sensors;

l. Means for determining a hypocenter location and an origin time for signals from each said micro-earthquake event in real time as said events occur, based on hypocenter location data with an earthquake hypocenter location program;

m. Means for recording a hypocenter location and an origin time for each said micro-earthquake event in an event list in real time, wherein said list is continually updated with a new location and origin time of each said micro-earthquake event as said events occur;

n. Means for creating and displaying a visualization image, using computer codes and real time event locations, source mechanisms and orientations, wherein said visualization image comprises:
  (1) Displaying a rotatable, three dimensional, real time, visualization of said hypocenter locations, wherein said visualization is provided with high resolution;
  (2) Accurately imaging and visually displaying development, growth, propagation, direction and velocity of fractures in real time as said injection continues;
  (3) Displaying said visualization;
  (4) Rotating a three dimensional display on a screen as desired to show any desired cross section and map view;
  (5) Displaying predicted fracture geometry and comparing it with current actual geometry as displayed in real time during said injection process; wherein said predicted fracture geometry is updated on a real time basis to provide continuing updated predictions and models of future growth; and
  (6) Visualizing said fracture growth in real time displayed within an image of the local geology, in spatial relationship to other geologic formations, zones, reservoirs, wells, fractures and sources of potable water, and simultaneously providing the observer with an updated visual image and display of data concerning the properties of the disposal operation including pressure, slurry volume, flow rate and viscosity, as injection continues;

o. Means for depicting and displaying map visualizations:
  (1) Wherein the areal extent of said map provides a real time demonstration of the location and extent of waste filled fractures;
  (2) Wherein said map provides real time verification that said fractures are contained in said selected injection zone; and
  (3) Wherein the direction and velocity of any migration of seismic activity toward a sensitive zone is immediately evident, permitting management decisions and actions including shut down or modification of injection flow rates and pressures to be accomplished; and p. Means for integrating a data installing, receiving, acquisition, compression, processing, calculating, determining and visualization means into a modularized work station system for in-process management and control of hydraulic fracture treatments and for verification of geologic containment of hydraulic fractures.

7. A method useful for disposing of a slurry comprising a slurry of a hazardous material or a particulate solid by injecting the slurry at fracturing conditions into at least one fracture in a selected subterranean zone, while continuously monitoring the extension and location of the fracture in real time and verifying in real time that the fracture remains contained within the selected subterranean zone, the method consisting essentially of:

a. Injecting the slurry into the selected subterranean zone at fracturing conditions so that the slurry is injected into the fracture in the selected subterranean formation;

b. Detecting seismic signals generated and propagated through the earth in the vicinity of the fracture which are generated as micro-earthquakes resulting from the formation and propagation of the fracture, and communicating the seismic signals to a computer programmed to receive, record and analyze the seismic signals continuously and in real time;

c. Determining the locations of at least a portion of the micro-earthquakes on a real time basis, and determining from the location of the micro-earthquakes the extension and location of the fracture;

d. Displaying the extension and location of the fracture relative to the subterranean zone and surrounding geological fractures; and e. Monitoring and controlling the extension and location of the fracture on a real time basis to insure containment of the slurry in the selected subterranean zone.

8. The method of claim 7 wherein the slurry of material is injected into the subterranean zone through an injection well and wherein monitor wells are positioned to extend into the subterranean zone and contain sensors to detect the seismic signals generated and propagated through the earth as the fracture is formed and propagated.

9. The method of claim 7 wherein the display of the extension and the location of the fracture includes a display of the injection well and the monitor wells.

10. A system for disposing of a slurry by injecting the slurry at fracturing conditions into at least one fracture in a selected subterranean zone while continuously monitoring the extension and location of the fracture and verifying that the slurry is contained within the selected subterranean zone, the system comprising:

a. An injection well extending into the selected subterranean zone;

b. A plurality of monitor wells about an anticipated fracture zone extending from the injection well wherein the monitor wells each contain a plurality of seismic signal sensors positioned above, below or at the level of the anticipated fracture zone;

c. Slurry production and injection equipment in fluid communication with the injection well to inject the slurry into the selected subterranean zone;

d. Conductors in data transmitting communication with the seismic signal sensors and a data receiving and processing system which is capable of substantially continuously recording and processing the seismic signals to determine the extension and the location of the fracture in real time based upon the seismic signals;

e. A display in communication with the data receiving and processing system upon which the extension and the location of the fracture is displayed in real time to permit monitoring of the extension and the location of the fracture and to permit verification that the slurry is contained within the selected subterranean zone; and f. A control apparatus for adjusting the injection pressure and the injection rate to control the growth of the fracture.

11. A real time process for monitoring and controlling the extension of hydraulic fractures in earth formations wherein a slurry comprising waste material or particulate solids is injected into the fractures for disposal, the process comprising:
   a. Positioning an injection well extending into the earth formation;
   b. Positioning at least two monitor wells in the anticipated fracture zone, the monitor wells including seismic event sensors positioned therein;
   c. Injecting the slurry comprising waste material or particulate solids into the earth formation at fracturing conditions to form or extend the fractures thereby resulting in the occurrence of micro-earthquake events as the fractures are formed or extended;
   d. Detecting the occurrence of seismic waves generated by the micro-earthquake events at the seismic event sensors;
   e. Connecting the seismic event sensors to a data recording computer, the data recording computer including an analog to digital converter and a central processing unit; wherein the converter is adapted to continuously acquire signals from the seismic event sensors, convert the signals to digital data and transmit the digital data to the data recording computer; and
   f. Transmitting at least a portion of the digital data to a recording system or via a buffer to a network and via the network to a second computer operable to receive the digital data from the data recording computer, the second computer including programming to store and process the digital data on a real time basis to determine the location and extension of the fractures and display the location and extension of the fractures.

12. A real time system for monitoring and controlling the extension of hydraulic fractures in earth formations wherein a slurry comprising waste material or particulate solids is injected into the fractures for disposal, the process comprising:
   a. An injection well extending into the earth formation;
   b. At least two monitor wells in an anticipated fracture zone, the monitor wells including seismic event sensors positioned therein;
   c. A pump system to inject the slurry comprising waste material or particulate solids into the earth formation at fracturing conditions to form or extend the fractures thereby resulting in the occurrence of micro-earthquake events as the fractures are formed or extended;
   d. Seismic event sensors adapted to detect the occurrence of seismic waves generated by the micro-earthquake events;
   e. Connectors connecting the seismic event sensors to a data recording computer, the data recording computer including an analog to digital converter and a central processing unit; wherein the converter is adapted to continuously receive signals from the seismic event sensors, convert the signals to digital data and transmit the digital data to the central processing unit; and
   f. A buffer including a recording system or a network adapted to transmit at least a portion of the digital data via the network to a second computer operable to receive the digital data from the data recording computer, the second computer including programming to store and process the digital data on a real time basis to determine the location and extension of the fractures and display the location and extension of the fractures in real time.

* * * * *